(12) United States Patent
Waldo et al.

(10) Patent No.: US 7,769,712 B2
(45) Date of Patent: Aug. 3, 2010

(54) DOCUMENT VALIDATION SYSTEM AND METHOD

(75) Inventors: Andrew B. Waldo, Bethesda, MD (US); Yong Zou, Potomac, MD (US); Clive Raven, Sittingbourne (GB); Kevin Kenny, Brunswick, MD (US)

(73) Assignee: Decernis, LLC, Washington, DC (US)

( * ) Notice: Subject to any disclaimer, the term of this patent is extended or adjusted under 35 U.S.C. 154(b) by 247 days.

(21) Appl. No.: 11/773,368

(22) Filed: Jul. 3, 2007

(65) Prior Publication Data

US 2008/0034000 A1    Feb. 7, 2008

Related U.S. Application Data

(63) Continuation-in-part of application No. 11/614,811, filed on Dec. 21, 2006.

(60) Provisional application No. 60/752,980, filed on Dec. 21, 2005, provisional application No. 60/755,897, filed on Dec. 30, 2005.

(51) Int. Cl.
*G06F 7/00* (2006.01)
(52) U.S. Cl. ...................................... 707/609
(58) Field of Classification Search ............. 707/2, 707/609
See application file for complete search history.

(56) References Cited

U.S. PATENT DOCUMENTS

| | | |
|---|---|---|
| 5,495,581 A | 2/1996 | Tsai |
| 5,519,608 A | 5/1996 | Kupiec |
| 5,615,268 A | 3/1997 | Bisbee et al. |
| 5,638,446 A | 6/1997 | Rubin |
| 5,708,825 A | 1/1998 | Sotomayor |
| 5,838,458 A | 11/1998 | Tsai |
| 5,878,406 A | 3/1999 | Noyes |
| 6,122,647 A | 9/2000 | Horowitz et al. |
| 6,272,505 B1 | 8/2001 | De La Huerga |
| 6,389,151 B1 | 5/2002 | Carr et al. |
| 6,507,872 B1 | 1/2003 | Geshwind |
| 6,615,199 B1 | 9/2003 | Bowman-Amuah |
| 6,636,242 B2 | 10/2003 | Bowman-Amuah |
| 6,678,864 B1 | 1/2004 | Tsai |
| 6,754,873 B1 | 6/2004 | Law et al. |
| 6,785,864 B1 | 8/2004 | Te et al. |
| 6,925,599 B2 | 8/2005 | Wood |
| 6,957,185 B1 | 10/2005 | Labaton |
| 2002/0103869 A1 | 8/2002 | Goatly et al. |
| 2003/0028451 A1* | 2/2003 | Ananian ............... 705/27 |
| 2003/0028494 A1 | 2/2003 | King et al. |
| 2003/0058277 A1 | 3/2003 | Bowman-Amuah |
| 2003/0182386 A1 | 9/2003 | Geshwind |
| 2003/0182387 A1 | 9/2003 | Geshwind |
| 2003/0182439 A1 | 9/2003 | Geshwind |

(Continued)

FOREIGN PATENT DOCUMENTS

WO    WO/01/22284 A2    3/2001

OTHER PUBLICATIONS

Search Report and Written Opinion dated Sep. 29, 2008.

*Primary Examiner*—Charles Rones
*Assistant Examiner*—Fazlul Quader
(74) *Attorney, Agent, or Firm*—Crowell & Moring LLP

(57) ABSTRACT

The present invention relates generally to the field of self-validating documents in supply chain management, documentation services and method for creating the same.

5 Claims, 19 Drawing Sheets

U.S. PATENT DOCUMENTS

| | | |
|---|---|---|
| 2003/0195980 A1 | 10/2003 | Geshwind |
| 2003/0229637 A1 | 12/2003 | Baxter et al. |
| 2003/0233552 A1 | 12/2003 | Baldwin et al. |
| 2004/0046997 A1 | 3/2004 | Tsai |
| 2004/0064710 A1 | 4/2004 | Vainstein |
| 2004/0078337 A1 | 4/2004 | King et al. |
| 2004/0113930 A1 | 6/2004 | Hawley et al. |
| 2004/0215959 A1* | 10/2004 | Cook et al. .................. 713/156 |
| 2004/0225887 A1* | 11/2004 | O'Neil et al. ............... 713/193 |
| 2005/0021480 A1 | 1/2005 | Haff et al. |
| 2005/0038756 A1 | 2/2005 | Nagel |
| 2005/0060324 A1 | 3/2005 | Johnson et al. |
| 2005/0108001 A1 | 5/2005 | Aarskog |
| 2005/0210026 A1 | 9/2005 | Wood |
| 2006/0247944 A1 | 11/2006 | Calusinski et al. |

* cited by examiner

FIG. 4

| DID | CLASS_DID | HEAD_NAME | NAME_OHLIST | CLASS_NAME | CITATION | FILE_NAME |
|---|---|---|---|---|---|---|
| 304 | | (E)-2-Butenoic acid | Crotonic acid | | 21 CFR 176.180 Paper/paperboard (dry food) | 21cfr176.180.pdf |
| 304 | | (E)-2-Butenoic acid | Crotonic acid | | 21 CFR 176.170 Paper/paperboard: aqueous and fatty foods | 21cfr176.170.pdf |
| 304 | | (E)-2-Butenoic acid | Crotonzuur | | Koninklijk besluit van 11 mei 1992 - Wijziging : Koninklijk besluit van 10 december 2002, Materialen en voorwerpen bestemd om met voedingsmiddelen | c1_be_arrete_10_dec_2002.pdf |
| 304 | 294798 | (E)-2-Butenoic acid | Ácidos | Ácidos | Lista Positiva de Polímeros y Resinas para Plásticos en Contacto con Alimentos | ar_contact_packaging_2004.pdf |
| 304 | 19307 | (E)-2-Butenoic acid | Mischpolymerisate aus Ethylen, Propylen, Butylen und ungesättigten aliphatischen Säuren sowie deren Salzen und Estern | Mischpolymerisate aus Ethylen, Propylen, Butylen und ungesättigten aliphatischen Säuren sowie deren Salzen und Estern | BfR Empf. 20 [XX.] Polyisobutylen/Mischpolymerisate | de_200deutsch.pdf |
| 304 | 14699 | (E)-2-Butenoic acid | ungesättigte aliphatische Säuren | Ungesättigte aliphatische Mono- und Dicarbonsäuren C3-C8 | BfR Empf. 21 [XXXI.] Natur- und Synthesekautschuk | de_210deutsch.pdf |
| 304 | 14699 | (E)-2-Butenoic acid | Ungesättigte aliphatische Mono- und Dicarbonsäuren C3-C8 | Ungesättigte aliphatische Mono- und Dicarbonsäuren C3-C8 | BfR Empf. 35 [XXXV.] Mischpolymerisate: Ethylen, Propylen, Butylen, Vinylestern, ungesättigten aliphat. Säuren | de_350deutsch.pdf |

FIG. 6

2.1 2-Mercaptoethanol (CAS Reg. No. 60-24-2): Not to exceed 2 percent by weight of the stabilizer formulation.

3.1 Mineral oil (CAS Reg. No. 8012-95-1): Not to exceed 40 percent by weight of the stabilizer formulation.

4.1 Butylated hydroxytoluene (CAS Reg. No. 128-37-0): Not to exceed 5 percent by weight of the stabilizer formulation.

FIG. 8

| ID | NAME | CITATION | FILE_NAME |
|---|---|---|---|
| 1477 | Mineral reinforced nylon resins | FDA. Indirect Additives List (E to O). | indirects_e_o.pdf |
| 372211 | Mineral oils and hydrocarbons | Directive 80/68/EEC: Protection of groundwater against pollution caus 1980_68_ec.pdf | |
| 364197 | Mineral oil based greases | Processing Aids | au_proc_aids.pdf |
| 433853 | Mineral paraffins | Opinion_EFSA: Mineral oils in jute and sisal bags | en_efsa_7_dec_2004.pdf |
| 1476 | Mineral oil, white | FDA. Indirect Additives List (E to O). | indirects_e_o.pdf |
| 1476 | Mineral oil, white | 21 CFR 178.3740 Plasticizers in polymeric substances | 21cfr178.3740.pdf |
| 1476 | Mineral oil, white | 21 CFR 176.170 Paper/paperboard: aqueous and fatty foods | 21cfr176.170.pdf |
| 1476 | Mineral oil, white | FDA EAFUS (H to N). | eafus_h_n.pdf |
| 279581 | Mineral oils | Opinion_EFSA: Mineral oils in jute and sisal bags | en_efsa_7_dec_2004.pdf |
| 279581 | Mineral oils | Directive 96/77/EC 5. Amendment. Directive 2003/95/EC, amending; 2003_95_ec.pdf | |
| 1476 | Mineral oil | 21 CFR 178.2010 Antioxidants and/or stabilizers for polymers | 21cfr178.2010.pdf |

DOCUMENT VALIDATION SYSTEM AND METHOD

CROSS REFERENCE TO RELATED APPLICATIONS

This application is a continuation-in-part application of U.S. patent application Ser. No. 11/614,811, entitled "Document Validation System and Method", to Andrew B. Waldo, et al., filed on Dec. 21, 2006, which claims priority of U.S. Provisional Patent Application Ser. No. 60/752,980, entitled "Document Validation System and Method", to Andrew B. Waldo, et al., filed on Dec. 21, 2005, and of U.S. Provisional Patent Application Ser. No. 60/755,897, entitled "Document Validation System and Method", to Andrew B. Waldo, et al., filed on Dec. 30, 2005, and the specification and claims thereof are incorporated herein by reference.

This application also claims priority to Patent Cooperation Treaty Application Serial No. PCT/US06/62516, entitled "Document Validation System and Method", filed on Dec. 21, 2006, and the specification and claims thereof are also incorporated herein by reference.

BACKGROUND OF THE INVENTION

The present invention relates generally to the field of self-validating documents in supply chain management, documentation services, method and data processing system for creating the same.

Millions of documents are passed in global commerce between supplier and recipient containing control statements within certification documents, such as for the safe use and handling of a product or its compliance with applicable restrictions. Studies have shown a high rate of error in such documents.

Global trade in products between a supplier and a customer depends upon the control statements made in certification documents, such as Material Safety Data Sheets and Safety Data Sheets (MSDS or SDS), letters of certification or compliance certifications, because such control statements define the parameters of use of the product. For example, an MSDS for a hazardous substance or formulation, has become the common means by which the supplier communicates to the customer the controls necessary for safe handling of the product as well as its compliance with applicable restrictions whether in the U.S. at the federal or state level, or the requirements of another country or international convention.

With regard to other types of products, a letter of certification or compliance certification document from the supplier of food and consumer products contains control statements that communicate requirements applicable to the use of the product. For instance, a certification document might accompany the supplier's shipment of a food packaging material to stipulate that the product could be used only with certain types of foodstuffs under the requirements of the Food and Drug Administration or similar governmental agencies of other countries. Such certifications may relate to regulations, standards, religious codes (e.g., keeping Kosher), scientific studies and the like. Millions of such documents are generated and transmitted every year in many different languages and countries for many different types of products and uses.

In many cases such documents are a compilation of standard control statements defining various parameters of use of the product. It is common for such documents to be prepared and generated using a document authoring system or enterprise resource planning (ERP) system such as SAP from a phrase library that may have different language variants.

However, although the recipient of a generated certification document has the control statements for the product, he is not able to obtain or validate the source document supporting a control statement in an automatic way. Nor can the recipient automatically determine whether a change relevant to a control statement in the received certification document might have occurred from the time of the document's creation.

Moreover, the recipient may wish to use the product in a different market or area of the world, and is unable to relate the control statements relevant in one jurisdiction to parameters of use in other jurisdictions or areas. Independently of the supplier's certifications the recipient may also simply wish to review the control statements in a certification document to determine whether information is missing or for which he requires additional information by reviewing the source document of such a statement. Finally, the recipient may wish to relate the general information conveyed about the product in the received document to information about a specific shipment of that product received from the supplier where the shipment has, for example, a particular RFID code. This last aspect is especially important where a product recall or alert has occurred for specific shipments of a product.

It is desirable, therefore, to provide a data processing system to support the automatic validation of control statements made about products flowing through the supply chain. Normally, validation of a control statement is done as a manual task by the recipient. Providing a data processing system for such information will improve the safety of products in the supply chain, will improve the transparency of global product requirements, will reduce cost of product approval, and will reduce mistakes.

It is also desirable for the customer to validate the control statements of the supplier whenever possible through an automatic data processing system. Although the customer must legally rely on the statements of the supplier, a prudent customer may wish to independently validate such a certification by looking up the reference to determine that it is current or to assure himself or herself that important omissions have not been made.

The communication of control statements is not simply a one-to-one relationship between a supplier and a customer, but rather between a many-to-one relationship of multiple upstream suppliers in a supply chain with the customer. The customer may receive a certification document with control statements that depend upon the specific claims of an upstream manufacturer of raw materials used by the immediate supplier of the customer; however, the upstream manufacturer may be unwilling to disclose important source information to the immediate supplier without a non-disclosure agreement, because of claims of confidentiality or trade secrecy.

For example, a manufacturer of a plastic sells to a small converter that produces formed cups to a yogurt food processor. The small converter may provide certifications, but these depend on the materials used in the conversion process. Often it is not the certification statement itself that is confidential; rather it is the source document supporting the statement that is confidential (e.g., test results or toxicological study). Thus, the yogurt food processor has a critical need to be assured of claims or compliance certifications that include both the immediate supplier and the upstream raw material suppliers. The need of the customer is to validate control statements of the immediate supplier as well as—to the extent permitted by the upstream supplier and under terms agreed to by the customer—the control statements passed through the supply chain from upstream manufacturers that concern raw materials or other conditions important to the immediate customer's use of the received product.

Many such certification documents transmitted by suppliers to customers—important though they are—contain omissions or errors. Indeed, according to a recent study of the completeness of safety data sheets: "The deficiencies for the different headings [that is, of the 16 sections of a standard format MSDS] vary between twenty percent and forty percent". ECLIPS: "European Classification and Labeling Inspections of Preparations, including for Safety Data Sheets", Final Report 2004 published by the European Enforcement Network, page 11. In consequence, the control statements made in the safety data sheets reviewed in the study have deficiencies that may include missing control statements, out-of-date control statements, or other errors. Further, according to the report, the error rates of regulatory statements in section fifteen of the MSDS, where required regulatory certification statements are made, averaged 35%. Ibid. Similar findings have resulted from Canadian studies. Welsh M. S.; Lamesse M.; Karpinski E. "The Verification of Hazardous Ingredients Disclosures in Selected Material Safety Data Sheets." Applied Occupational and Environmental Hygiene, Volume 15, Number 5, 1 May 2000, pp. 409-420 (12). OSHA has performed studies of MSDS quality:

Based on the chemical ingredients identified, the accuracy in the other four areas of concern was evaluated based on information obtained from readily available reference sources. The evaluation indicated that 37% of the MSDSs examined accurately identified health effects data, 76% provided complete and correct first aid procedures, 47% accurately identified proper personal protective equipment, and 47% correctly noted all relevant occupational exposure limits. Only 11% of the MSDSs were accurate in all four information areas, but more (51%) were judged accurate, or considered to include both accurate and partially accurate information, than were judged inaccurate (10%). (Found at the world wide web address osha.gov/dsg/hazcom/finalmsdsreport.html).

Given the importance of such certification documents and the control statements that they contain to the safety of the recipient, means to improve accuracy, as addressed in the present invention should be established. A number of studies agree: Error rates in supplier certification statements are high.

In the area of food safety, FDA has established processes for review of hazards: Hazard Analysis and Critical Control Point (HACCP). Nevertheless frequent reports appear where a food processor has purchased a material that contains a contaminant not reviewed adequately, especially with regard to imports and exports of foods and foodstuffs.

China's safety and quality watchdog said 8 percent of domestic dried fruits and vegetables failed safety tests, mainly because of excess sulfur dioxide residue, after rejecting some U.S. raisin imports for the same reason.

The General Administration of Quality Supervision, Inspection and Quarantine also found that 13 percent of chili products did not meet safety standards.

The agency Friday announced that imports of a brand of U.S. raisins had been rejected for high sulfur dioxide levels, along with three kinds of U.S. health supplements with excess bacteria and mold. It also called on local officials to boost monitoring of U.S. food exports amid tensions over food safety.

All the below-standard products found in the sampling came from small producers.

China has seven million small-food processors, 30 percent of which do not comply with hygiene standards, according to Wang Lei, a researcher at the Shenzhen Institute of Standards and Technology. "8 pc of dried vegetables fail tests". *The Standard*. Jun. 12, 2007 (Found at the worldwide web address thestandard.com.hk/news_detail.asp-?we_cat+3&art_id=46542&sid=14013053&con_type=1&d_str=20070612)

The probability of error between supplier and customer increases with the volume of certification documents and the number of suppliers. In chemical-using industries, the number of raw materials for a single manufacturer can be thousands or tens of thousands and the number of suppliers in the hundreds or thousands. The same holds true in the food-processing and food-related industries. As a result there is an essential need to improve methods of validation of supplier's statements and to monitor important changes that may have occurred that relate to the supplier's statements.

It is true that the supplier may have proprietary evidence to support a certification and may not have revealed the full composition of a formulation under restrictions on the disclosure of confidential business information, in which case an independent evaluation is limited. Nevertheless, the customer can perform many checks based on the information presented by the supplier, and may as a standard practice adopt a review and validation of a supplier's certification statements.

Further, apart from any regulatory requirements, a number of industries have established their own internal standards that must be met in any procurement of raw materials by the company. For example, Volvo has established: VOLVO Corporate Standard STD 1009,11 (Established Feb. 2, 1998) CHEMICAL SUBSTANCES WHOSE USE WITHIN THE VOLVO GROUP SHALL BE LIMITED (VOLVO'S GREY LIST).

Such ad hoc customer procurement standards that are in addition to any mandatory governmental requirement and accepted only in the face of market pressure have become widely accepted in part because of the difficulties and high error rates in certification documents being passed in the supply chain between supplier and customer. In addition, these standards are subject to change without notice. Such ad hoc standards increase the cost of compliance and its complexity, and reflect the need for an improved method of producing, distributing, and validating certification documents in the supply chain.

A customer has several validation needs:

Accuracy and Currency. Has the supplier correctly cited a supporting reference related to the safe handling of a product and is it current?

Access to Source Documents. Can the customer obtain the cited reference?

Access to Cited References. How can the customer obtain a cited sub-reference within the cited document?

Completeness. Are there other related restrictions or references that have been omitted or overlooked?

Global Scope. Are there similar restrictions in other countries or languages?

Customer's Use vs. Supplier's Scope. Are there other restrictions that apply to the customer's use in another market, but which the supplier has not directly addressed in the certification that are nonetheless critical to the customer (e.g., the customer purchases a product in the U.S., and receives a U.S. certification document but intends to use it as a component or trans-ship it to another country)?

Change Management Regarding Supplier Statements. After a period of time subsequent to the first receipt of the certification how can the customer be informed if an important amendment or modification has occurred related to a certification for the product that the customer has purchased? Again, although many regulations require the automated updating of MSDS or other certifications in the event of a "significant" regulatory change, many recipients seek to independently review supplier information.

Change Management with Regard to Customer's Uses. After a period of time subsequent to the first receipt of the certification how can the customer be informed of other related changes of interest but not provided by the supplier that may affect the customer's use of the product, for example, in a country to which transshipment occurs?

Upstream Supplier Certifications. Access to upstream supplier certifications relating to the immediate supplier's product or changes in these certifications under authorized terms and conditions acceptable to the upstream supplier.

Today, suppliers and customers seek to establish checks within their business processes and to establish review systems within their organizations, but it is prone to error and oversight especially in light of the complexity of global markets. The reason is straightforward: These review systems are separated from the certification document itself. The present invention provides a data processing system to support automatic validation and addresses this need.

There are many ways in which suppliers generate such certification documents either manually or by automated means within a system. For example, enterprise resource planning systems (ERP's) such as that of SAP (e.g., SAP EH&S) assist suppliers in automatically generating MSDS.

The components of such systems often include:

A composition database containing products and detailed composition and raw materials Properties tables or databases containing associated values, classifications, and restrictions applicable to substances and properties. Such property tables may also include the automated calculations from business rules;

Phrase libraries—sometimes with translations of phrases—that contain control statements to be included in generated documents;

Transaction control tables that include data that prevents or alerts the potential shipment, purchase, import, export, or sale of a product that may be forbidden;

Document databases that include the generated documents or other documents that may be associated with a product, substance, or process; and, Business rule tables with conclusions (Left Hand Side—LHS) actions that depend on criteria (Right Hand Side—RHS parameters). For example, if benzene is a component in a formulation greater than 0.1 percent used in the United States, then insert the phrase code associated with the conclusion "carcinogenic" into the properties table for this substance identifier.

There are a number of current limitations in such systems:

ERP and document authoring systems as SAP EH&S, do not today include a dynamic component, such as a hyperlink, in phrase libraries of control statements used in the creation of certification documents, one that permits the recipient to validate a control statement within a received document in an automatic manner;

ERP and document authoring systems do not provide for validation of control statements through automatic means in generated certification documents for products from within the generated documents;

Although it is common for a manufacturer to hyperlink from a product listing on a web-site page to a related MSDS or technical document associated with the product, for example, it does not exist that the control statements in the certification document hyperlink to the authoritative source document for that statement or data element.

Data processing systems do not exist to pass certification documents containing dynamic control statements with hyperlinks in business-to-business exchange of such between computer systems in computer readable form so that the control statements with hyperlinks can be extracted and placed in a database for further use.

As a result, such data processing systems do not today allow the generation of certification documents that permit automated third-party validation and change management support services in association with control statements made.

Such data processing systems do not use the loading and storage of certification documents with control statements using hyperlinks.

It is not possible to obtain direct access to upstream manufacturer control statements or certification documents as described through a central service and no general practice or data processing system exists to provide this information.

One of the most difficult tasks of regulatory managers within supplier and customer organizations is keeping up with new or modified regulations or standards. Such compliance tracking tasks focus on the raw materials purchased, the substances manufactured, the processes themselves, or the products sold or distributed. The regulatory manager may use enterprise systems, subscribe to publications, participate in trade organizations, or search the web for information about change.

Equally difficult is the task of determining or obtaining upstream raw material certifications for products obtained from the immediate supplier.

It is desirable, therefore, to provide the capability for such a regulatory manager to validate a dynamic control statement within a certification document by a hyperlink to the source document supporting the control statement. In addition, it is desirable to provide the capability for the recipient of a certification document to determine by clicking a hyperlink whether amendments, new requirements, or modifications that pertain to a control statement have occurred for a given period of time, for example, since the time that the certification document was generated.

It is desirable, therefore, to provide a system by which a recipient's computer system can receive a certification document with its control statement from an upstream supply chain actors in such a manner that the recipient can store and re-use these control statements in authoring a further certification document for a product where the parameters of use are dependent on the control statements of the upstream supplier. Further, the downstream recipient does not have a system by which he can validate the control statements of the upstream provider, if authorized.

There are many services where you can enroll to receive updates of journals, regulations with customized scope defined by the user. Such services include:

Westclip on Westlaw

ECLIPSE on Lexis/Nexis

U.S. Federal Register

However, the regulatory manager, researcher, or document recipient is interested in changes that relate to the context of the certification document and a particular control statement within it, which at present means that the process of analyzing the control statements within a certification document is separate from and totally independent of the process of tracking changes. The complexity and discontinuity of these two important processes—receiving the certification document and determining changes that relate to such a document's control statements—increase the probability of accidental non-compliance.

In addition to the data processing system for self-validation of certification documents, it is desirable for the researcher to obtain relevant documents from a searching or indexing system that will return a compilation of documents that includes not only direct references to the search term for a material but also a synonym, identifier, translation, or reference to a class or group containing the search term as a member. It is also desirable if the document reference from such a search will return the document opened at the relevant page with the applicable direct reference, synonym, identifier, translation, or reference to a class or group containing the search term as a member. Finally, it is desirable if the researcher can obtain a subset of documents, for example, only those that have changed where the returned reference is to a document containing not only a direct reference, but also a synonym, identifier, translation, or reference to a class or group containing the search term as a member.

Publishers maintain large libraries of abstracts of knowledge in various areas related to science and business, among other fields. One example is the ILLUMINA® system published by CSA and another is SCOPUS® by Reed-Elsevier. Although such systems may contain links to the full-text documents associated with an abstract, they do not include either the search capabilities or validation system as described in this invention.

Referring now to FIG. 12, an example prior art search from Google® illustrates the need. In this instance, the researcher has searched for a material, specifically, a chemical, which is "crotonic acid". Google® returns two thousand five hundred and twenty (2,520) document references. Entering a synonym, "(E)-2-Butenoic acid" returns only twenty-two (22) document references. A Dutch synonym, "Crotonzuur" returns no hits and the message: "Try different keywords". This search illustrates both a searching display and a searching index that does not return document references that include a compilation of not only direct references, but also synonyms or translations of a material term. This is a common approach of existing search displays and indexing methods, for example, Google®, SCOPUS®, ILLUMINA®, and others.

In searching for documents relevant to a material, the research is often interested in documents that include a reference to a class of which the search term is a member. For example, if the user enters the term, "crotonic acid", he or she may be interested in a document that refers to "Ungesättigte aliphatische Mono- und Dicarbonsäuren" because the meaning of this chemical class with many members includes the specific substance, crotonic acid. Similarly, if the user searches for "sodium chromate", the user would be interested in documents that include a reference to "hexavalent chromium compounds". Such indirect references to broad classes including the direct search term are not returned by the example searches above of Google®.

The search term and interest in a reference to a broad group may not necessarily be a chemical, but also a foodstuff, biologic, or formulation. A comprehensive search for the term, "orange", according to the present invention, should return a link to a document including a reference to "citrus fruits, except lemon and limes". Current search systems may return synonyms, (e.g., TOXNET) and may include related identifiers and translations of substance names, but do not include a systematic cross-referencing system for such; nor do they include parent classes within the context of the regulation or referenced document.

An identifier for a material is a particular type of synonym. Many such identification systems are used by regulatory or scientific organizations, where an alphanumeric code represents a material. For example, the European Union uses EINECS numbers to refer to existing chemicals. FDA has its own system, as do the governments of Japan and Korea. Other systems, include color index numbers, etc. It is desirable to provide a system and method that spans any identifier returning documents that include a reference, whether that reference is a synonym, translation, parent group or class, or identifier in addition to any direct reference.

Web-based search engines do not include such features whether in the simultaneous display of document links containing references to synonyms, translations, identifiers, and parent groups in addition to direct references or whether in methods used to index documents to extract references to such terms.

Current systems, including those noted above, do not:
  Search with the scope and methods described above or in this invention; nor
  Return a document opened at the relevant page with the term highlighted.

SUMMARY OF THE INVENTION

One embodiment of the present invention includes a system for validating at least a portion of a certification document for at least one material. The system includes a certification document including at least one dynamic control statement relating to and defining parameters of use for the at least one material, wherein the certification document is accessible by at least one recipient, and, wherein the dynamic control statement is validated by retrieving validation information relating to the dynamic control statement from a dynamic source of validation information.

Another embodiment of the present invention includes a method for indexing documents in a data processing system, the documents including a reference to at least one material, comprising: inputting a document into the data processing system; extracting at least one alphanumeric string from the document; determining relevant alphanumeric strings from the extracted alphanumeric strings by processing the extracted alphanumeric strings utilizing at least one algorithm by comparing, in sequence and in combination, the extracted alphanumeric strings with material terms in at least a dictionary database of common material terms; matching the relevant alphanumeric strings with materials alphanumeric strings stored in the data processing system; and storing the matched alphanumeric strings in respective matched records in the data processing system.

Another embodiment of the present invention provides methods for generating, distributing, validating, and searching documents about products that include standardized phrases that are claims made about the compliance of the product with guidelines, standards, and laws or that are properties of the product supported by a bibliographic reference to a literature reference.

Yet another embodiment of the invention provides for a database of standard phrases (hyperlinked standard phrase database) each with its own with unique identification code, a text phrase that defines a specific claim or statement, optional translated variants of the text phrase in a one-to-one relationship to the unique identification code, and a hyperlink to a server that can retrieve a document or translation supporting the specific claim made by the standard phrase. In this manner, the Hyperlinked Standard Phrase Database can be distributed and used by many parties in the supply chain so that any document generated that includes the phrase will have a standard meaning and any recipient of the document can validate the statement through clicking on the hyperlink.

Another embodiment of the invention provides for the Hyperlinked Standard Phrase Library Database including a hyperlink that will return an index, compilation or reference to all changes in the source documents relating to the statement.

A further aspect of the method above is that it allows the author of the document to use a standard enterprise resource planning system (ERP), such as SAP, Oracle, or other document authoring system to include standard phrases from the phrase database as well as his or her own phrases in a flexible manner so that the document can contain a combination of phrases that are standard, other phrases from upstream suppliers of raw materials, and phrases inserted by the document's author. The standard phrases can be selected based on need by the document's author in a completely free and flexible manner. What is new is that the standard phrase will have a hyperlink to a document or function retrieving the relevant text. In addition, the standardization of the hyperlinks permits the recipient of a document in any form that accepts hyperlinks to retrieve source documents associated with a claim from a centralized service that can route and retrieve hyperlinked source documents from any server wherever located.

A further aspect of the method above is that it allows for a system of user authorization associated with standard phrases contained in generated product documents. In this manner, an upstream supplier can pass to his direct customer a statement with a hyperlink to a secure server open only to authorized users. Let us suppose that the statement is public but the source documents supporting the claim are confidential. Thus, the customer can include the statement in an authored document and distribute the document to his downstream customers, but the control to open access to the confidential supporting document is controlled by the provider of the standard phrase.

Another embodiment of the present invention also relates to a method for indexing documents including a description of at least one material in a data processing system. The method includes inputting a document into the data processing system; extracting at least one alphanumeric string from the document; determining relevant alphanumeric strings from the extracted alphanumeric strings by processing the extracted alphanumeric strings utilizing at least one algorithm by comparing, in sequence and in combination, the extracted alphanumeric strings with material terms in at least a dictionary database of common material terms; matching the relevant alphanumeric strings with materials alphanumeric strings stored in the data processing system; and storing the matched alphanumeric strings in respective matched records in the data processing system.

Another embodiment of the present invention provides methods for searching document management systems and an improved means of efficiently locating, searching, and categorizing documents stored on Internet web-sites to enable identification and cross-referencing of references to dangerous chemicals within documents in any language.

One aspect of the present invention provides for post-processing of identified documents to permit a document to be opened at a relevant page with the term of interest highlighted, and in the integration of found documents into a validation system supporting certification documents transmitted between supplier and recipient Another aspect of the present invention provides a validation that can be established from within the document itself in an analogous manner to the checks that occur in giving a credit card to a merchant in order to effect a purchase. A third-party service supports the security of the transaction between merchant and customer that reduces fraud and improves the efficient functioning of markets—based on the credit card itself.

Another aspect of the present invention provides a review system and related validation technologies based on the certification document itself.

One aspect of the present invention provides for a system of self-validating documents with independent validation support services. Another aspect of the present invention provides a self-validating certification documents passed between supplier and recipient based on standard phrases to be included in such documents together with validation hyperlinks that invoke a series of services, including: a) the retrieval of a cited document opened at a referenced page with a highlighted section associated with a material, material class, topic, use, or legal citation; b) the retrieval of summary reports of all requirements related to the standard certification phrase; c) the retrieval of all amendments, additions, and deletions of requirements related to the certification phrase; d) the retrieval of related property data records that may be automatically loaded into a document management or enterprise resource planning system; and e) the retrieval of transaction control alerts. One embodiment of the present invention provides for the generation indexing, extraction, and formation of documents containing validation links.

Another aspect of the present invention provides a system of self-validating documents through which a downstream recipient of a certification document can assure himself of upstream certifications related to the submission of the immediate supplier in a confidential manner acceptable to an upstream supplier. Another aspect of the present invention provides self-validating certification documents passed to the validation service by the upstream supplier, including a standard phrase, a validation hyperlink to the source document, and an authorization procedure. If the downstream user accepts or meets the conditions of the authorization procedure, a series of services are made available that relate to the upstream certification in the context of the immediate supplier's product or use, including: a) the retrieval of a cited upstream supplier document opened at a referenced page with a highlighted section associated with a material, material class, topic, use, or legal citation; b) the retrieval of summary reports of all requirements related to the standard certification phrase, including the supplier's confidential certification statements; c) the retrieval of all amendments, additions, and deletions of requirements related to the certification phrase, including the upstream supplier's confidential certifications; d) the retrieval of related property data records that may be automatically loaded into a document management or enterprise resource planning system, including upstream supplier data; and e) the retrieval of transaction control alerts, including transaction control alerts that relate to the upstream supplier's certifications.

Another aspect of the present invention provides for the generation indexing, extraction, and formation of documents containing validation links.

Yet another aspect of the present invention provides that the user to search for a standard synonym and return a highlighted reference to a literal reference on the page of a document, which provides the capability to link proper synonyms to literal names found within the text of a document that may not be "acceptable", as well as the ability to link in synonyms based on confidential upstream supplier references;

Another aspect of the present invention provides linking not only to sets of chemical substances but to any "material" that may not be chemicals in the proper sense at all that may be biological agents, products, or concepts ('sweeteners'), including but not limited to confidential upstream supplier materials.

Another aspect of the present invention provides a system of self-validating documents including direct submissions between a supplier and a recipient as well as multiple party submissions through a chain of supplier-user relationships.

An aspect of the invention provides for supporting the validation system in its method to search and index documents in order to extract references to materials, material classes, and legal citations.

An aspect of the invention provides for supporting the validation system through access to upstream supplier certifications or certification documents through an authorization system.

Additional objects and advantages of the present invention will be apparent in the following detailed description read in conjunction with the accompanying drawing figures.

BRIEF DESCRIPTION OF THE DRAWINGS

FIG. 4 is a diagram of a certification document including a dynamic control statement according to one embodiment of the present invention.

FIG. 6 is a diagram of a database produced by the method for indexing documents of one embodiment of the present invention.

FIG. 8 is a diagram illustrating an alphanumeric string in a document to be indexed utilizing the method of one embodiment of the present invention.

FIG. 9 is a chart illustrating a materials database of one embodiment of the present invention.

FIG. 13 is a diagram illustrating the results of a search term in a non-English language, e.g., Chinese, where in this case the term is 三聚氰胺(melamine).

DETAILED DESCRIPTION OF THE INVENTION

Figure 1:
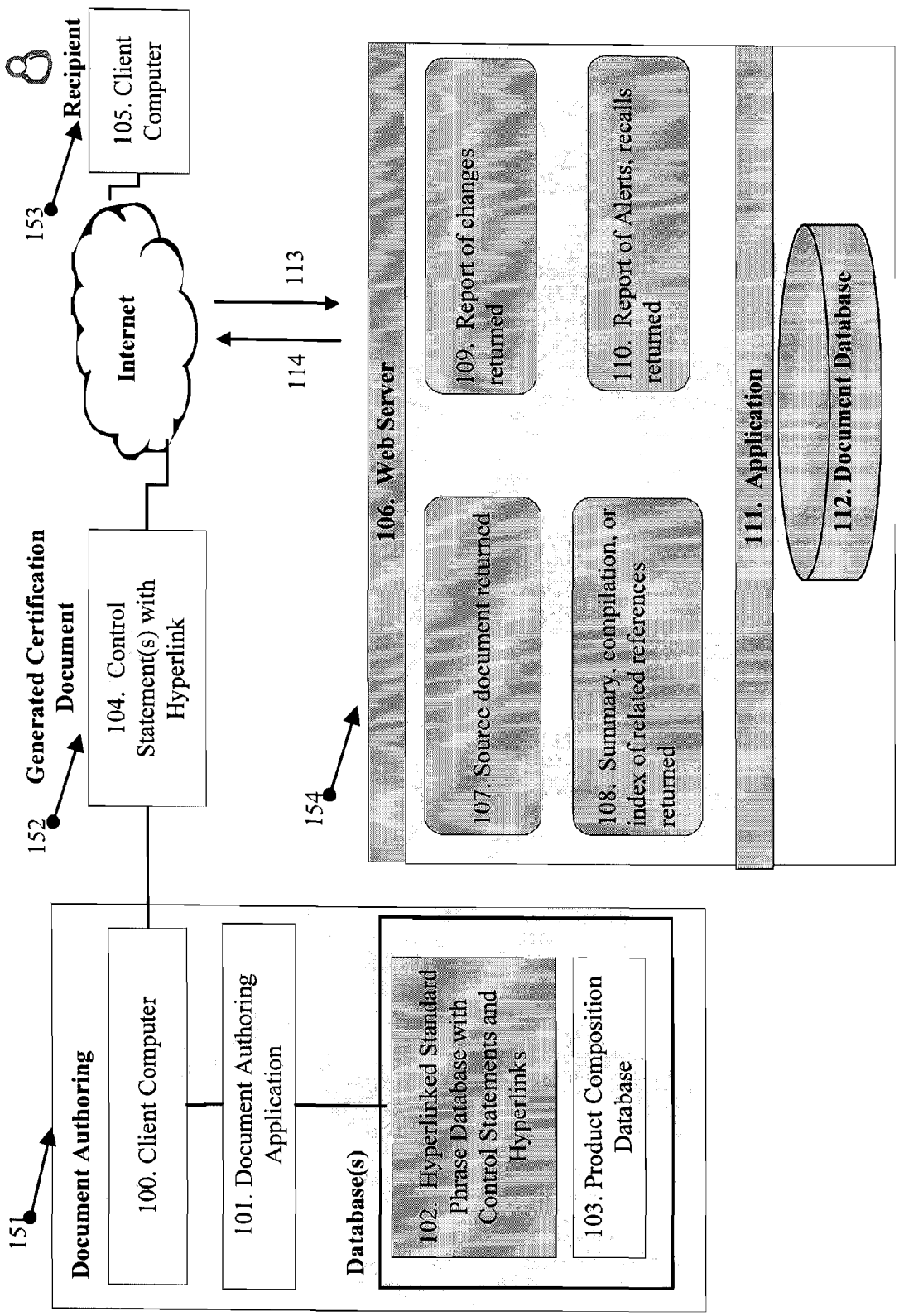
FIG. 1 is a block diagram of a system for validating certification documents according to one embodiment of the present invention.

"certification document"—As used in this invention, a certification document comprises: A purchase order, advanced shipment notice, shipping document, material safety data sheet, compliance certification statement, customer procurement standard, compliance statement, technical dossier, label, guideline, legislation, regulation, and standard as well as any document, submission, or compilation required for REACH (Registration, Evaluation, Authorization and Restriction of Chemicals under any related requirements). A certification document includes proposed and final publications and analysis of same.

"control statement"—As used in this invention, a control statement is a phrase intended to be included in a document to communicate the parameters of use of a material.

"authoring system"—As used in this invention, an authoring system is a software application employed for one of the preparation, generation, and distribution of a certification document.

"dynamic control statement"—As used in this invention, a dynamic control statement is a control statement that includes a function that can be executed by the recipient to retrieve one of a document, document reference, document link, compilation, summary, data, and function to perform the same. An example of a function that is included in a dynamic control statement is a hyperlink. An illustration of such a dynamic control statement might be "This product complies with EU Directive 2002/72/EC" found on the worldwide web at decernis.com/reference/document/2002_72_en.pdf.

"parameter of use"—As used in this invention, a parameter of use is a restriction, limitation, approval, guideline, standard, practice, recommendation, characteristic, behavior, measure, and data for a material.

"recipient"—As used in this invention, a recipient is a human being and a computer system.

"validation information"—As used in this invention, validation information is a dynamic control statement, source document, compilation, summary, alert, recall, and reference supporting said dynamic control statement.

"data processing system"—As used in this invention, a data processing system is a one or more programmable electronic devices that can store, retrieve, and process data.

"logical function"—As used in this invention, a logical function is a business rule, programmable computer routine that performs a calculation with variables and returns a result. For example, a business rule expressed descriptively is "if the concentration of a component of a mixture is above 0.1% and that component is a listed carcinogen, then insert the control statement database key which is associated with the phrase 'Carcinogenic'." An example of a logical function expressed descriptively is "if the web server receives a request from a dynamic control statement for a variable associated with the retrieval of a document from the server's document database, then a check should be performed of the user's authorization in the authorization database".

"material"—As used in this invention, a material means a chemical, formulation, biological product, food, any virus, therapeutic serum, toxin, antitoxin, analogous product, and finished article. Examples of materials include but are not limited to formaldehyde, orange, peanut, mycotoxin, aflatoxin, perfume, polymers, compounds, Irganox, a food or foodstuff, and serums. Examples of a finished article includes a toy, a packaged soup.

"document"—As used in this invention, a document means a computer file whether as a whole or deconstructed into component parts for electronic transmission and communication.

"alphanumeric string"—As used in this invention, an alphanumeric string means a sequence of computer codes representing letters, numbers, and control characters, such as a line ending and punctuation mark.

"algorithm"—As used in this invention, an algorithm is a computer procedure that begins in an initial state and terminates in a definite end state, applied here to process alphanumeric strings to prepare for, compare, determine the relevance of, and terminate indexing and searching related to a material term. For example, an algorithm to prepare an individual alphanumeric string for matching with a material term, is to strip all punctuation codes, raise all letters to capital, and to store the result in temporary memory. Another example of an algorithm is to compare any given alphanumeric string after processing with a database of material terms similarly processed and sorted in order of longest terms first.

"sequence"—As used in this invention, a sequence is one or more alphanumeric strings extracted from a document in a defined order. For example, the order of extraction includes but is not limited to the presentation of columns within a document and processing in order within a column. Another example is that the order of extraction of alphanumeric strings should follow the natural order of the language, i.e., from left-to-right in English.

"dictionary database"—As used in this invention, a dictionary database is a collection or records stored systematically in an electronic medium so that it may be queried.

"common words"—As used in this invention, common words means a dictionary of terms that are ignored as noise in indexing.

"matching"—As used in this invention, matching is a procedure that terminates in accepting or rejecting an alphanumeric string extracted from a document to determine whether it is identical to a term describing a material stored in a database.

An embodiment of the invention is a data processing system that improves the capability of a recipient of a certification document to validate dynamic control statements made in the document to define the parameters of use of a product by including within the document hyperlinks that retrieve the source document or reference supporting the given dynamic control statement from a web server (see FIG. 1). This embodiment has the effect of communicating data about the parameters of use of a product to improve product safety and compliance.

Figure 1A:
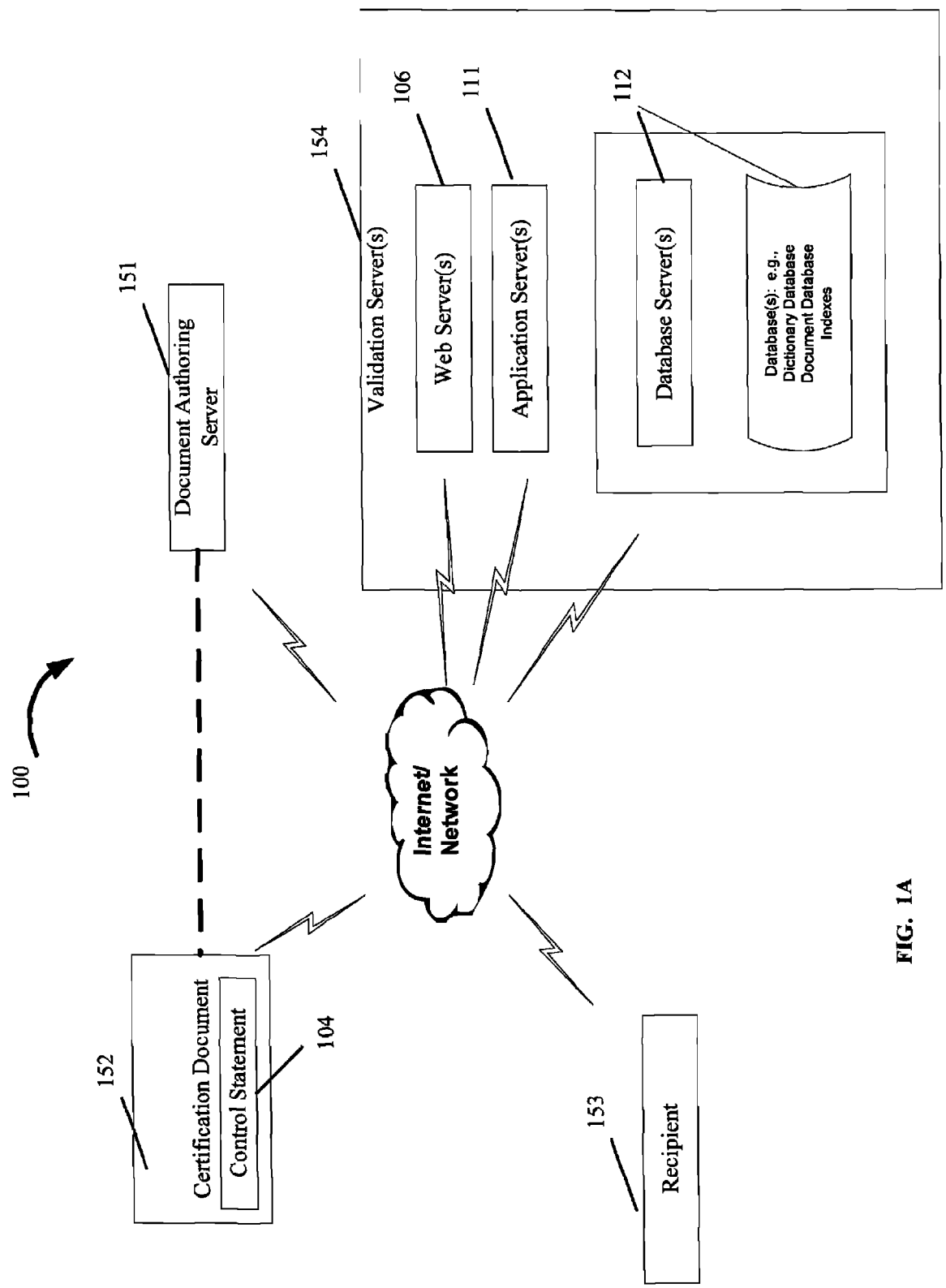
FIG. 1A is a block diagram of a system for validating certification documents according to one embodiment of the present invention.

Referring now to FIGS. 1 and 1A, a data processing system using hyperlinked dynamic control statements in a certification document is illustrated according to one embodiment of the present invention. A certification document 152 is generated by an author from a client computer 100 via a document authoring application 101 that resides on a document authoring server 151 for a product sent to a recipient 153. Dynamic control statements for a product retrieve, e.g., by hyperlink, an authoritative source document 102 and are included in an electronic certification document 104 for electronic transmission to the recipient 153 via a network. However, a recipient may also receive the electronic document via computer readable medium, such as XML or other electronic document exchange or by posting or sending a link to a secure web server, discussed in more detail below, to the recipient 153. The recipient 153 validates a dynamic control statement, for example, by clicking on a hyperlink in the electronic certification document 104 that returns from a validation server 154 at least one of the following sources of validation information: (a) a source document 107 supporting the dynamic control statement; (b) a list of change(s) 109 relevant to the dynamic control statement; (c) a compilation 108 of references related to the dynamic control statement, and (d) alerts 110. The validation server 154 is preferably a dynamic source of validation information, as the information is preferably updated at least at predetermined intervals.

The request 113 is passed to the web-server 106, which may be in a number of different forms, including but not limited to HTTP, SOAP, remote object function calls, web services protocols, and the like. The web-server 106 passes the request to the application server 111 that returns a response to the request 114.

A hyperlinked standard phrase library 102 includes for each dynamic control statement at least one of the following and preferably including a hyperlink, hyperlink fragment, or other variable that serves to invoke a function: a unique identification code, a phrase identification code, a language code, a text string, and a hyperlink or hyperlink fragment stored in a database. In a preferred embodiment each dynamic control statement may have translated variants associated with dynamic components, e.g., hyperlinks, that will return from a server the source document supporting the statement. In another preferred embodiment the hyperlink may be fully formed or a unique fragment associated with the unique phrase code which when appended to a base URL address where the server application has been loaded will return from a server the source document supporting the statement.

A dynamic control statement with a hyperlink in the present invention can be included in a certification document, advantageously to providing the recipient 153 the capability to validate it.

The hyperlinked standard phrase library 102 is preferably integrated into a document authoring application 101, for example an enterprise resource planning system, such as SAP R/3, SAP EH&S, product life cycle management system, or material safety data sheet generation system. The author of the document 100 to be prepared for a material stored in the Product Composition Database 103 selects unique dynamic control statements with the hyperlinks that represent parameters of use to be included in the certification document for a given product. For example, a food contact certification document for a particular grade of polyethylene is being manufactured and an author selects the phrase "Kunstoffverordnung Nr. 476/2003" (with its associated dynamic component, e.g., hyperlink) to indicate the compliance of the manufactured product with an applicable food contact regulation in Austria. The author electronically places into a certification document the phrase with its hyperlink to the authoritative document so that the recipient can validate the dynamic control statement independently.

The generated certification document 152 may be in any form that accepts a hyperlink or logical function to retrieve validation information for a dynamic control statement 104, including HTML, RTF, Microsoft Word, Excel, Adobe PDF, or in a structured data format such as XML but not limited thereto.

The document received by the recipient 153 includes dynamic control statements with a hyperlink or logical function to retrieve the source document accessible from a validation server 154. The recipient of the certification document who wishes to examine the authority for a particular dynamic control statement may request 113 the source document from the hyperlink through the validation server. The web server 106 receives the request that is processed by the validation application 111 to retrieve the requested data from the database 112. The recipient is directed to the source document 114 through the web server 106.

Figure 3:
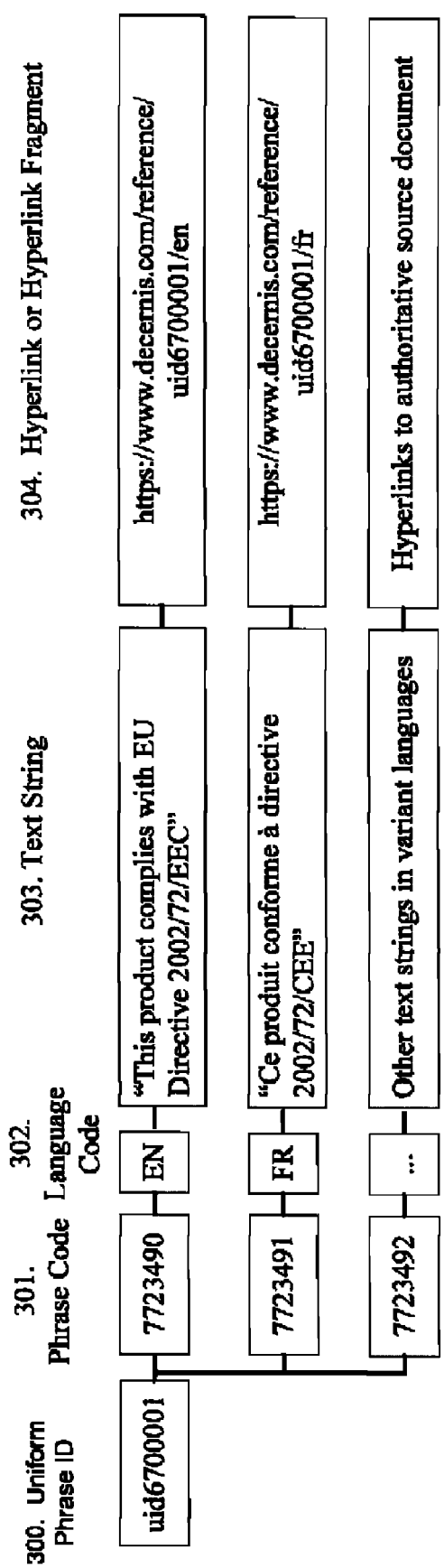
FIG. 3 is a chart illustrating an example of a hyperlinked standard phrase library of the system of one embodiment of the present invention.

FIG. 3 illustrates one example of an embodiment of the present invention for a Hyperlinked Standard Phrase Library of dynamic control statements with hyperlinks, providing a more detailed illustration of 102 in FIG. 1. In this example of a preferred embodiment, a unique identification code 300 groups dynamic control statements that have been translated into different languages so that the document authoring application 101 can produce a certification document 152 in FIG. 1 in any of the languages available in the Hyperlinked Standard Phrase Library. The Phrase Code 301 identifies the specific dynamic control statement in the database. The Language Code 302 defines the language of the text phrase, i.e., the dynamic control statement, 303. In addition, the hyperlink or hyperlink fragment 304 references the source document or documents supporting the specific dynamic control statement in any available language. The address of the hyperlink can refer to any one of the following to produce the results 107, 108, 109, or 110 for a dynamic control statement: A specific document, compilation, or summary in the document database 112 of FIG. 1, an index pointing to a document, compilation, or summary, or an argument of a function that will retrieve or generate a requested document, compilation, or summary.

Figure 2:
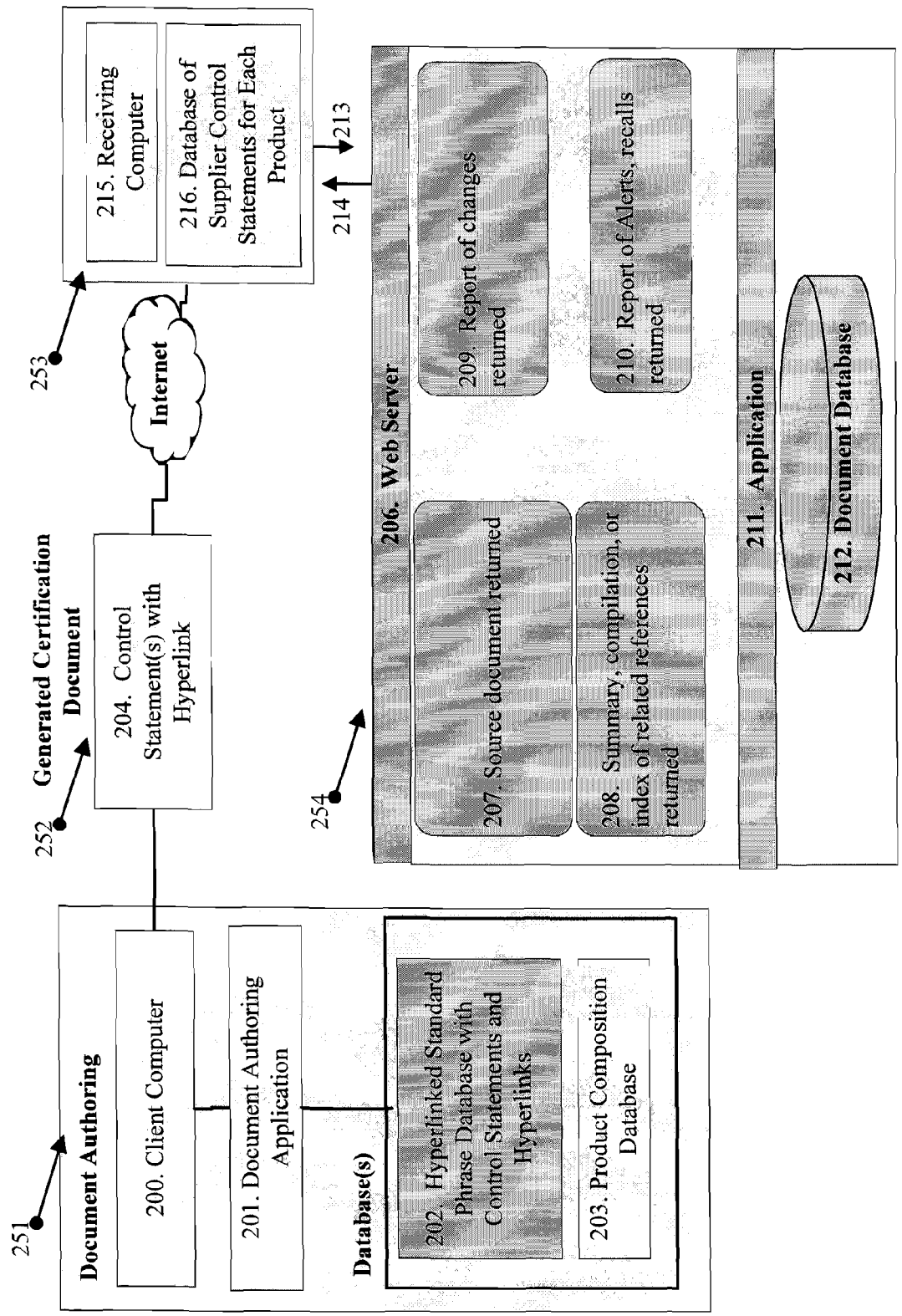
FIG. 2 is a block diagram of an alternative embodiment of the system of the present invention.

Referring now to FIG. 2 a data processing system using hyperlinked dynamic control statements in a certification document 252 is illustrated according to one embodiment of the present invention in which the certification document 252 is transmitted in computer readable form. In this embodiment of the present invention the certification document 252 is produced in a computer readable form, including XML or other electronic document exchange formats, in such a manner that a dynamic control statement 204 can be received by the recipient's enterprise system 253 via the receiving computer 215. The dynamic control statement can then be extracted and stored in the recipient's database 216.

Again referring to FIG. 2, in this embodiment of the present invention the recipient can produce electronic reports from the database 216 in the enterprise system 205 that include dynamic control statements received in certification documents for a product. The recipient using the enterprise system 253 can validate such dynamic control statements by clicking on a hyperlink in any such generated recipient electronic report will produce a request 213 that will return (214) from the validation server 254 at least one of the following sources of validation information: (a) a source document 207 supporting the dynamic control statement; (b) changes 209 relevant to the dynamic control statement; (c) a compilation 208 of references related to the dynamic control statement, and (d) alerts 210. The validation server 154 is preferably a dynamic source of validation information, as the validation information is preferably updated at least at predetermined intervals.

In a further embodiment of the present invention, the recipient can implement a document authoring system as in FIG. 1 and load the received dynamic control statements with hyperlinks or logical functions into the recipient's equivalent Hyperlinked Standard Phrase Library as in 102 of FIG. 1, thus permitting the reuse of dynamic control statements in a plurality of document authoring systems for any dynamic control statement passed through the supply chain. In an embodiment, the recipient's Hyperlinked Standard Phrase Library includes at least one of the following with hyperlinks: standard dynamic control statements, the recipient's own dynamic control statements, and received dynamic control statements. The recipient who has implemented a data processing system of the present invention can generate certification documents including dynamic control statements passed to the recipient.

One embodiment of the present invention provides a certification document with such hyperlinked dynamic control statements can be passed to a recipient in a computer readable medium so that the recipient can then include a received hyperlinked dynamic control statement in authoring a further certification document. In consequence, the embodiment provides a data processing system to improve the means of passing information in a supply chain to control the safe use and compliance of products in a standard manner and in a manner that permits the validation of a dynamic control statement included in a certification document being transmitted in a supply chain.

The present invention provides an improved capability to prepare and distribute hyperlinked standard phrase libraries that are industry, subject-specific, or within a supply chain with hyperlinks and optionally translation variants so that a manufacturer may prepare a certification document in a flexible way with any selection of applicable hyperlinked dynamic control statements according to the conclusions of the expert author of the certification document and thus to permit the recipient to evaluate the stated parameters of use of the product by reviewing the source document supporting each dynamic control statement made.

Further, one embodiment of the present invention improves upon current practice by providing a method by which the author of a certification document may add locally authored dynamic control statements to the hyperlinked standard phrase library or to insert in a certification document hyperlinked dynamic control statements received from upstream suppliers of raw materials, which improves the capability for upstream suppliers to communicate parameters of safe and compliant use of materials through certification documents that includes a data processing system that can be implemented by both direct recipients of a certification document as well as downstream recipients of a dynamic control statement associated with the raw materials of a value-added produce to validate the source documents or references associated with any given dynamic control statement.

Through the availability of translated variants, documents generated with a hyperlinked dynamic control statement may be in any language. Such translated variants may be required where the use of the document is in a country with more than one national language, for example, Belgium, Canada, or Switzerland.

A further embodiment of the invention improves upon the capability of the recipient of a certification document 152 to determine changes in associated source documents relevant to an included dynamic control statement 104 for a given period of time. Referring to FIG. 1 and FIG. 3, the recipient of a certification document 152 can request 113 changes 109 relevant to a dynamic control statement 104 in a certification document 152 for a given period of time. In an embodiment the argument of the hyperlink of a dynamic control statement can include a date in order to request (113) changes (109 in FIGS. 1 and 3) relevant to the source documents supporting a given dynamic control statement 104. For example, the argument of a hyperlink may include the date of the certification document's 152 generation in order that the recipient can be informed of amendments to a regulation cited by the dynamic control statement.

The invention provides a data processing system that improves upon one of the most difficult tasks for a recipient of a document in the supply chain, which is to determine whether important amendments or modifications have come into force, or further studies or standards, relevant to a specific claim made in a dynamic control statement. At present, this task is disadvantageously performed manually by the recipient. For example, if the text of the dynamic control statement is, "This product complies with EU directive 2002/72/EC for plastic materials in contact with foodstuffs" then the hyperlink request 113 to the validation server 106, 109 can return 114 references to all successive amendments to this directive since the time of the certification document's 152 generation. The invention thus provides an improved capability to provide a data processing system for standardized change management alerts for dynamic control statement 104 claims made in certification documents 152 to support the safe use of a product.

A further embodiment of the present invention is a data processing system to provide for product recalls and product alerts for specific shipments. In an embodiment of the present invention, an RFID identification number is associated with the certification document 152 or 252 or to one or more dynamic control statements 104 or 204 with hyperlinks or logical functions in order to return from the validation server 254 a product recall, alert, or other information applicable to a specific shipment.

The present invention improves the capability for a data processing system to provide alerts regarding product recalls 110, 210 or other information as described above from a validation server 106, 206 not only in relation to the product in general but to a specific shipment of that product identified by RFID identification code, such information regarding a product recall or alert being automatically provided in response to a request 113, 213 either from a human being 153 or from a computer system 253, which provides for the advanced shipment notice or other commercial business-to-business interaction in electronic document exchange format or in XML format to include a reference to a document generated with the Hyperlinked Standard Phrase Library and to an RFID identification of a specific shipment.

The described embodiments of the present invention improve the capability of the recipient to review MSDS and similar compliance certification documents, which otherwise must be carried out manually. The data processing system of the present invention further supports review of compliance and review of supplier certifications for foodstuffs, medical devices, pharmaceuticals, etc. The present invention is an improvement in that it is based on the document itself and not on an adjunct manual review process. An aspect of the present invention is to provide supply chain actors with a validation service bureau where such actors may generate may connect generate regular documents, regulatory compliance document preparation with the source document validation management that the invention provides.

A certification document or safety document is self validating upon review by the recipient. Currently a recipient must contact the supplier directly to validate documents.

Another embodiment of the present invention applicable to certification documents is that the document opened by the hyperlink or logical function of the invention may open a document, may open a document at a cited page, or may open a document at a cited page with a relevant section of the page or document highlighted. In such a form, the hyperlink or logical function contains an argument that includes the page(s) number of the cited document and the sections of those pages to highlight with the coordinates describing areas of the page to highlight. One example is to specify coordinates of the highlighted page by defining one or more rectangular areas of the page to highlight identified by the x,y positions of the axes of the rectangle that can be positioned on the space of a page. Other highlighted shapes or coordinate systems may be provided for within this invention. What is improved is the capability for the user of a certification document to click on the hyperlink or invoke a logical function so that the source document which will be returned from the validation server opened at the relevant page associated with the statement in the document with the highlighted relevant section of the page(s) of the source document.

A further embodiment of present invention provides access to a data processing system which is controlled by the level of service agreed to in a service agreement. In this aspect of the invention the hyperlink contains an additional argument which is an authorization code to control users authorized to view or download the source document referenced by the statement in the received document, which improves the general capability for upstream supply chain actors to provide documents containing statements referencing confidential information to intermediate and downstream actors in the supply chain. The downstream user can pass along the statement with the hyperlink or logical function to customers who may rely on this statement and be granted access based upon the privileges granted by the owner of the information hyperlinked with the statement, which improves the potential for a service bureau to manage authorization privileges for statements included in a Hyperlinked Standard Phrase Library. In this aspect of the invention it is not necessary for the service bureau to maintain the confidential documents themselves, only references to them with the reviewed authorization privileges.

Figure 4:
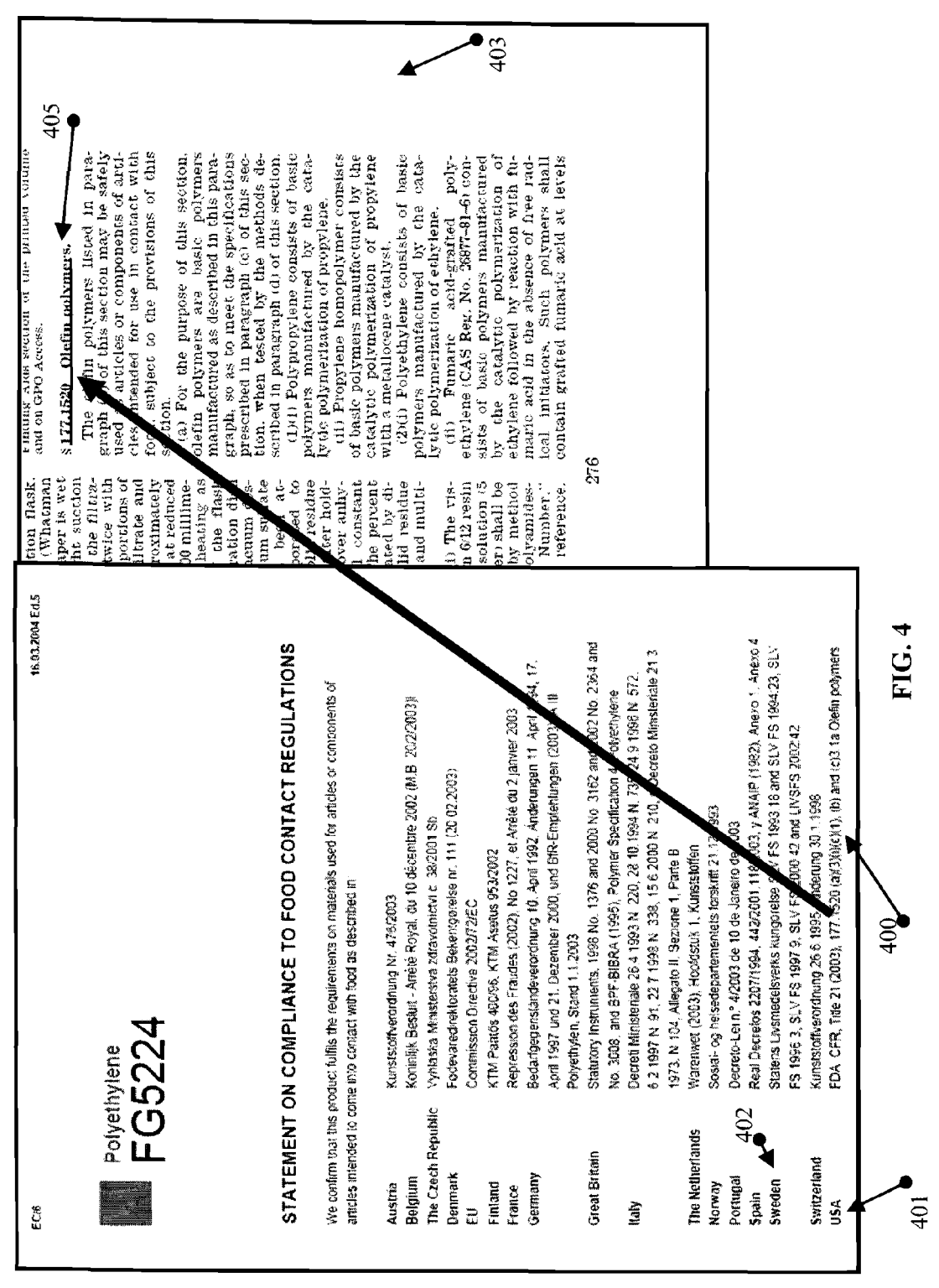

To provide an example of the type of certification document depicted at 152, 252 FIG. 4 shows a certification document for a Polyethylene product containing dynamic control statements that the product meets required approvals for its use in several countries. Each dynamic control statement contains a hyperlink of the type defined in the invention that permits the customer to receive a document that can perform one or more of the following:

- hyperlink to the text of the applicable cited regulation, optionally opened to the relevant page with a highlight of a section of the page.
- hyperlink to a validation server that will return all regulatory changes for the dynamic control statement since the date of the document's generation for the context of the letter for which the behavior of the returned format or information can be customized; this includes the capability for authorized users to obtain from a validation server the changes to the certifications of an upstream supplier;
- hyperlink to a validation server to return a summary report or compilation of other relevant requirements or restrictions of interest to the customer; This includes the capability for authorized users to obtain from a validation server a summary report including the certifications of an upstream supplier;
- hyperlink to a validation server to return a transaction control alert, such as "forbidden in transport by air";

hyperlink to a validation server to return data in a structured format.

In the example, 400 illustrates a dynamic control statement for the United States (401) while 402 illustrates a dynamic control statement for Sweden. Dynamic control statement 400 hyperlinks to document 403 with a preferred embodiment in which the section is highlighted 405.

400 illustrates a claim and instruction by the supplier for the safe use of the product, i.e., a dynamic control statement, that the product complies with 21 CFR 177.1520(a)(3) (2003). In the simplest case, the user may be interested in an immediate review of the relevant source regulation opened at the page with the relevant page with the section highlighted that relates to FDA regulation of "Olefin polymers" (as illustrated), a family of plastics that subsumes the specific product, Polyethylene. To produce this result, the supplier receives a Hyperlinked Standard Phrase Library (FIG. 1, 102) that contains identifiers, a phrase code, phrase texts in optionally different languages, and a validation hyperlink, as illustrated in FIG. 3. In this example embodiment the dynamic control statement is:

"FDA, CFR, Title 21 (2003), 177.1520 (a)(3)(i)(c)(1), (b) and (c) 3. 1a. Olefin Polymers."

The validation hyperlink for that phrase code is:
//decernis.com/reference/navpdf2.jsp?timestamp=6_5_2003&profile=1155&doc=2158789.pdf&pg=3&llx=156&lly=173&rux=196&ruy=183&lib=document in which the validation hyperlink or logical function may contain one or more components, such as:
URL [http://decernis.com/reference]
Target function [navpdf2.jsp]
Timestamp [6_5_2003]
Source
Identifier
Profile [1155]
Topic
Material
Document [2158789.pdf, page 3, and the document itself is to be retrieved]
XY positions [lower left x position (llx) at 156, lower left y position (lly) at 173, right upper x (rux) position at 196, right upper y position (ruy) at 183]
In consequence, the validation hyperlink or logical function can alternatively contain, for example, systematic information that can be associated with certification phrases in the document.

In this manner, a database of hyperlinked dynamic control statements as a component of the data processing system of the present invention can be distributed to many different suppliers permitting consistency and validation by recipients in the communication of the parameters of use of a product, while allowing for significant customization to meet the needs of a supplier. The validation database can include dynamic control statements of an upstream supplier that include a hyperlink to the source document contained in a database available only to authorized users. In this manner, the author of a document can assemble certification statements in a standardized as well as customizable manner that include both the immediate user's claims as well as upstream supplier claims although the upstream supplier claims would only be accessible to an authorized user. As a result certifications can be passed from multiple parties upstream in the supply chain, simplifying greatly the assessment task of an downstream user.

The supplier can use his or her document authoring environment to embed the appropriate phrase codes within a defined report template for a given product. The invention is providing a component that can be used in ERP or document authoring systems.

Once the document authoring step has been completed the supplier distributes the certification document in at least two ways:
The recipient may be an end-user (153), e.g., procurement expert for a customer reviewing compliance for global raw material acquisitions;
The recipient may be another ERP system (253) automatically connected in a business-to-business network in which the transaction data and documents are passed from the supplier's ERP directly into the recipient's ERP system.

The end-user can open the document in a number of different formats (Adobe PDF, Microsoft Word, HTML, etc.), and click on the validation hyperlink within the document itself (401). The user may invoke (or depending on the customization of the validation hyperlink) a number of different services from the validation hyperlink:
The source document may be returned opened at the relevant page, optionally with a relevant section highlighted (107, 207);
The validation service may provide a report of all amendments or modifications to the cited document since the date of the document's generation relative to the timestamp of the validation phrase code (109, 209);
The validation service may return a summary report of other regulations within the topical context of the document as defined in a profile (108, 208);
The validation service may return alerts, news of proposals relevant to the certification, or other transaction control information (110, 210).

In addition, if the document above contained a statement, such as "Raw materials used in processing comply with FDA requirements, according to supplier certification", the source document would be opened as above, but only to an authorized user.

The supplier of the Polyethylene certification has cited a 2003 dated CFR in the above example. An obvious question for the recipient is whether FDA has promulgated any changes to the citation from the time that the document was created. Two related issues arise: a) Was the supplier correct and current in citing the FDA approval; and b) have any changes occurred since? One aspect of the present invention provides validating documents for a quicker and more effective answer to these questions.

Further, the customer may wish to trans-ship the received polyethylene [as the example in this case] to another country not included in the list of certifications. At this point, although the supplier may not have, in some cases, disclosed all information necessary for a conclusive answer by the customer, the customer may wish to make an independent evaluation based upon the information provided for a number of reasons. The customer's intended market or use may be perceived as confidential information that the customer may be unwilling to disclose to the supplier.

As a result a rich set of validation services is provided on the basis of the system of validation of the invention, and these services are available to both supplier and recipient, as well as downstream in the supply chain.

Document Searching, Indexing, and Extraction of References to Materials and Material Classes: An aspect of the invention provides for supporting the validation system is its method to search and index documents in order to extract references to materials and material classes. The invention provides methods for:

Indexing, searching, and extracting direct references, identifiers, synonyms and multi-lingual references to "materials" from a document (e.g., 608, 703, 704); and Indexing, searching, and extracting multi-lingual references to "material classes" from a document (e.g., 609, 701, 702).

A material in the database has a common identification even if it may be referenced by many other identifiers as used in regulations or documents. Although prior art has defined any number of different types of databases of substances, the present invention is unique in several respects:

The database has a superset and unique concept of material that cuts across and relates individual occurrences to it;

The database structure links together proper names, synonyms, translations, identifiers, and literal names (i.e., alphanumeric sequences used in documents that refer to a material but may be erroneous or have ancillary alphanumeric characters associated with them), allowing a reference in a document, which may be entirely erroneous or in a different language, to be related back to both a proper synonym as well as to a larger concept of material; and, The database structure links all of these references together to the associated documents.

A material class is a superset containing one or more materials. An example of a class defined in many environmental, safety, and health regulations is "Chrome VI" compounds, which defines a particular membership of chromium compounds and includes sodium chromate. In order for the user of a material to meet applicable requirements, he or she must be aware not only of direct references to the substance but also indirect references, which apply through parent-child relationships. For example, sodium chromate is a "child" of the "parent" class, "Chrome VI compounds". In many cases, because the legal definition of the regulation's scope—or more precisely, the document's definitional context—the use in question may not be a scientific relationship but an arbitrarily defined one. As noted above, an automaker may define a set of materials that it has chosen not to purchase, as a matter of policy. Or, a document may refer to a particular list of salts, but not all salts of an acid.

Although prior art includes many uses of parent-child relationships in databases and to parent-child relationships of substances to groups, the present invention is unique in that:

Materials and material class references are related to their occurrence within documents;

Materials and material classes are defined within the scope of a document or regulation;

Materials can themselves be supersets of substances;

Materials and material classes are structurally linked to multi-lingual occurrences and to literal name occurrences.

One embodiment of the present invention is a method and data processing system to cross-index references to chemicals and materials in documents not only by a direct reference to a material but also by one or more of the following: synonym, identifier, translation, or material class of which the chemical is a member.

Figure 12:
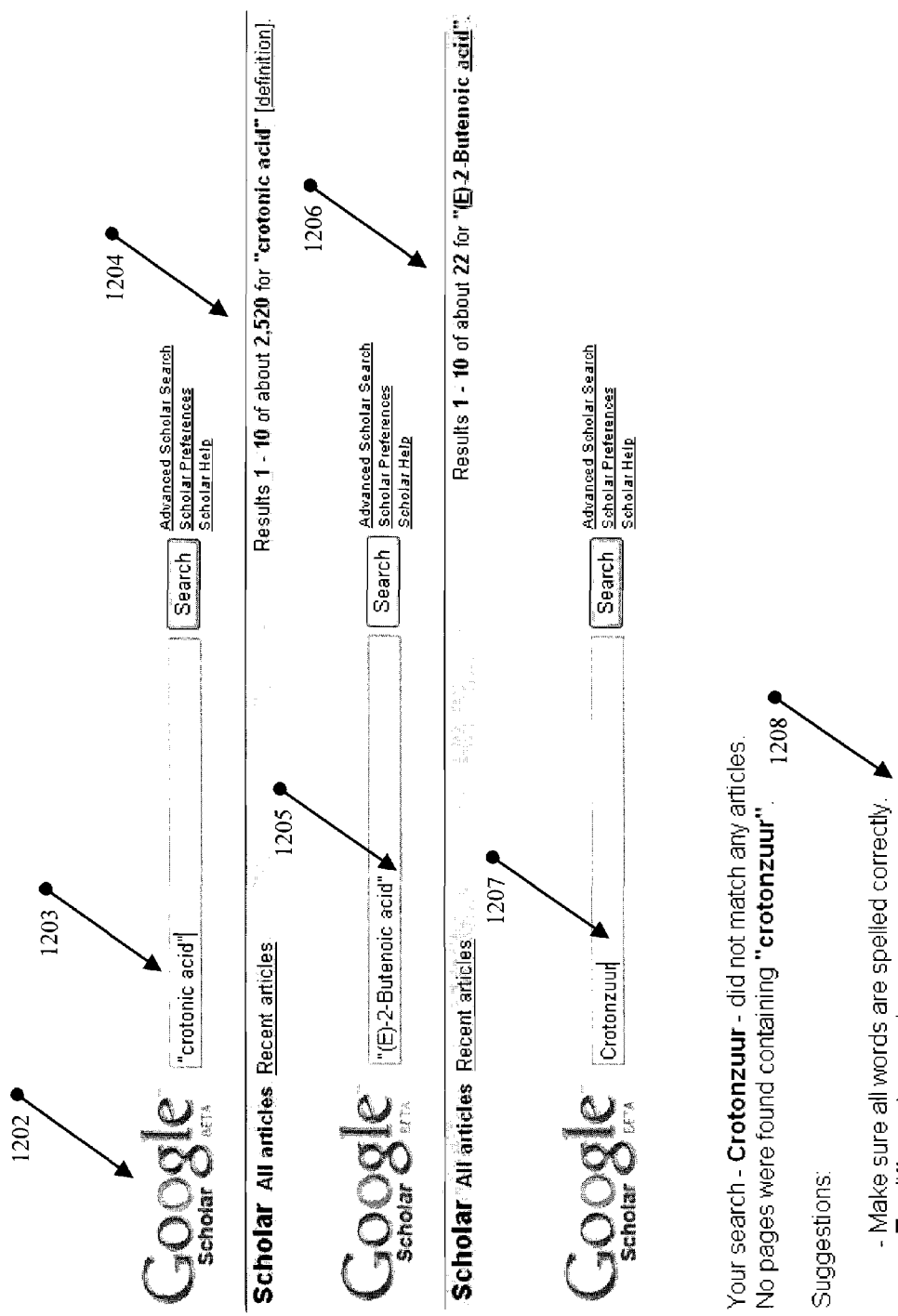
FIG. 12 is a diagram illustrating results of a search for a materials term according to the prior art.

An illustration from prior Art of the need for the embodiment of the present invention to provide a method and data processing system to cross-index references to chemicals and materials in documents is illustrated in FIG. 12, which provides the results from three searches from Google 1202, found on the worldwide web at scholar.google.com/. The first example 1203 is a search for the chemical, "crotonic acid" that returns two thousand five hundred and twenty document references (2,520) 1204. The second example is a search for a synonym of the chemical, "(E)-2-Butenoic acid" 1205 that returns twenty document references (22) 1206 that are not consistent with the references found in the first search. The third example is a search for a translation of the chemical, "Crotonzuur" 1207 that returns no search results from the Google index or search engine 1208. Similar results would occur for a chemical class of which crotonic acid is a member, such as "Ungesättigte aliphatische Mono- und Dicarbonsäuren C3-C8" or "Ácidos". The approach to indexing chemical terms by prior Art embodied by other suppliers provides similar inconsistencies: for example, the search above would provide similar inconsistent results but for a different document index library if the same three searches were performed on the publicly accessible demonstration of Illumina, found on the worldwide web at csa.com/.

Figure 7:
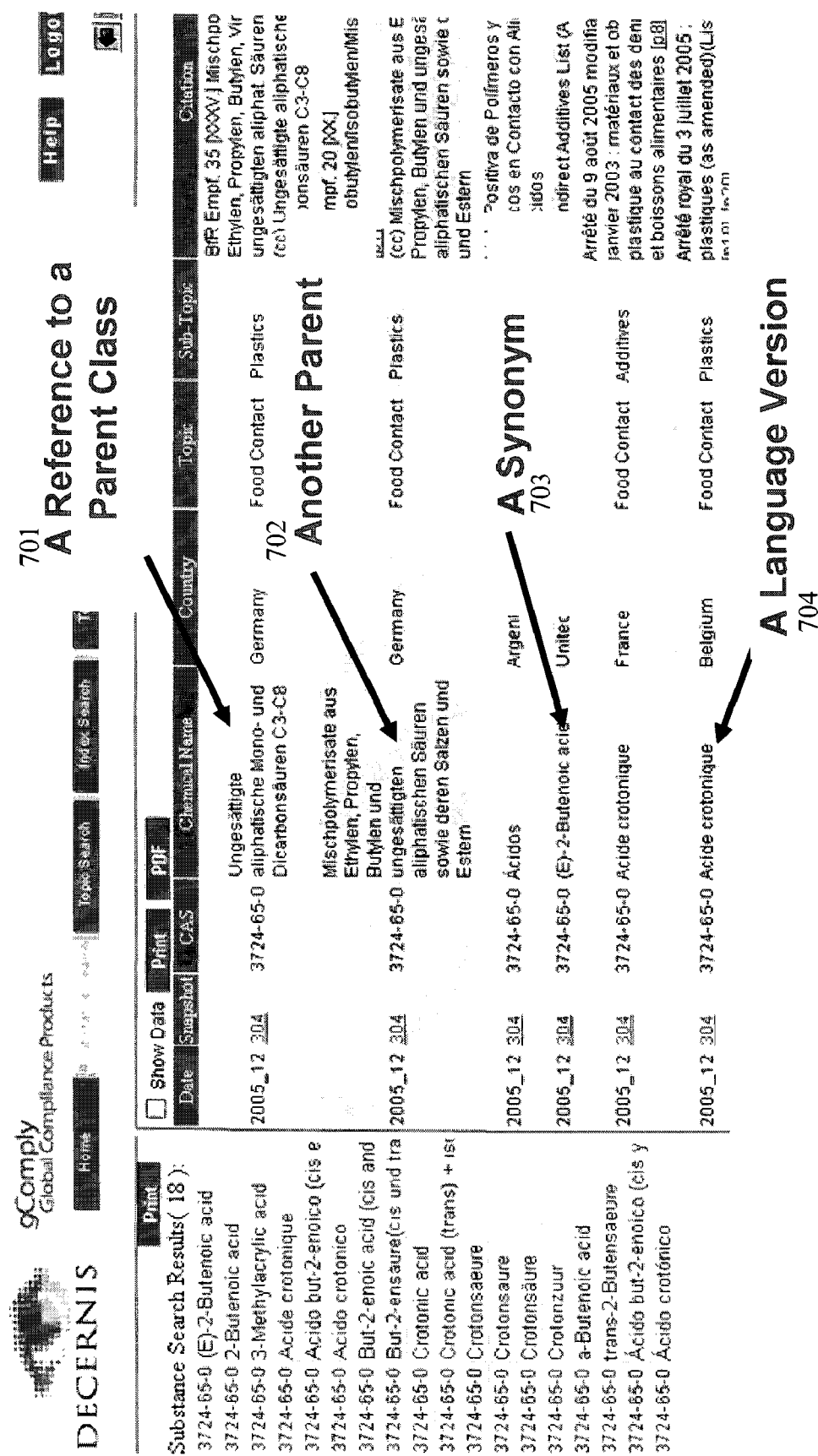
FIG. 7 is a diagram of a result of a search for a chemical term according to one embodiment of the present invention.

One embodiment of the present invention provides all matching available document references to the entered search term, synonyms of the search term, identifiers of the search term, translations of the search term or classes of which the chemical or material is a member can be returned from a search for a chemical or material term (see FIG. 7). In this embodiment, the synonyms may be in any language in order to return cross-indexed references (see FIG. 13).

Figure 5A:
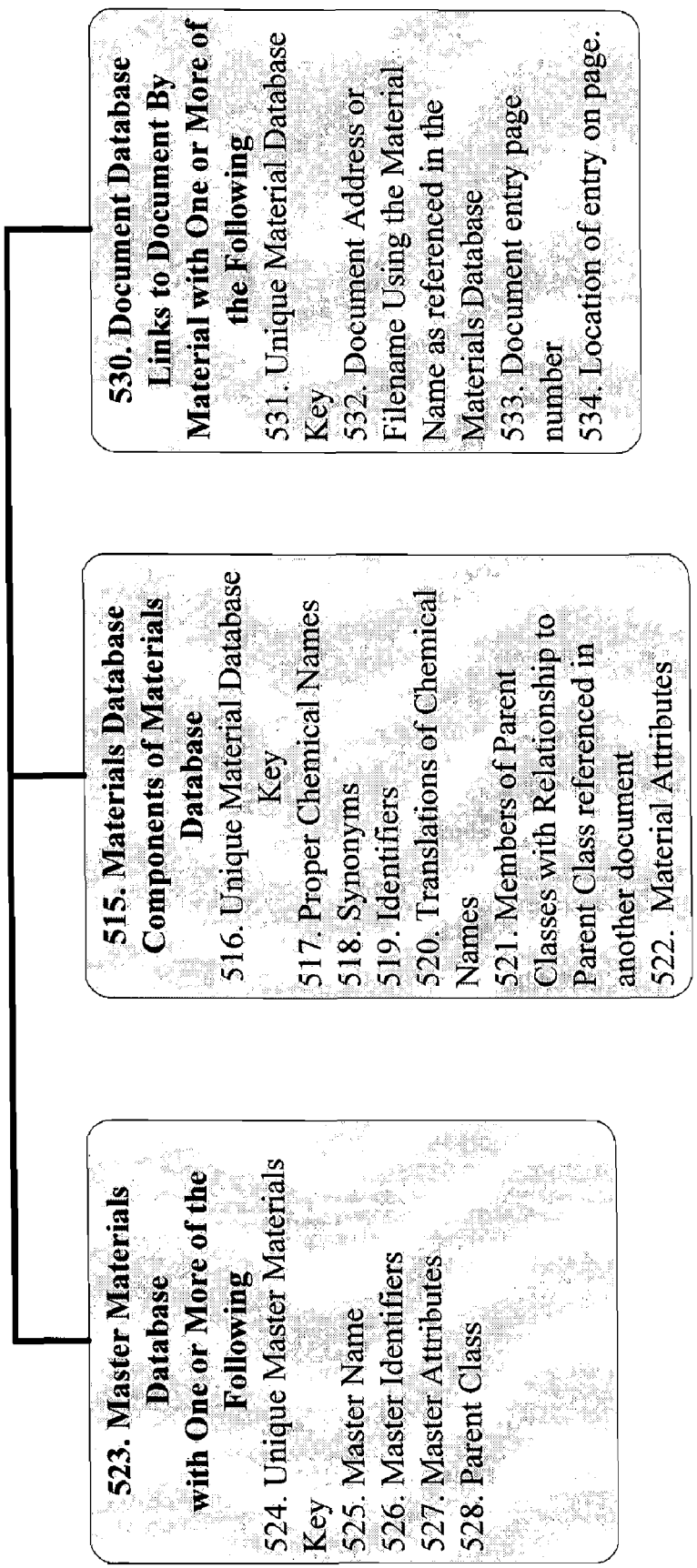
FIG. 5A is a block diagram of a data processing system according to one embodiment of the present invention.
Figure 5B:
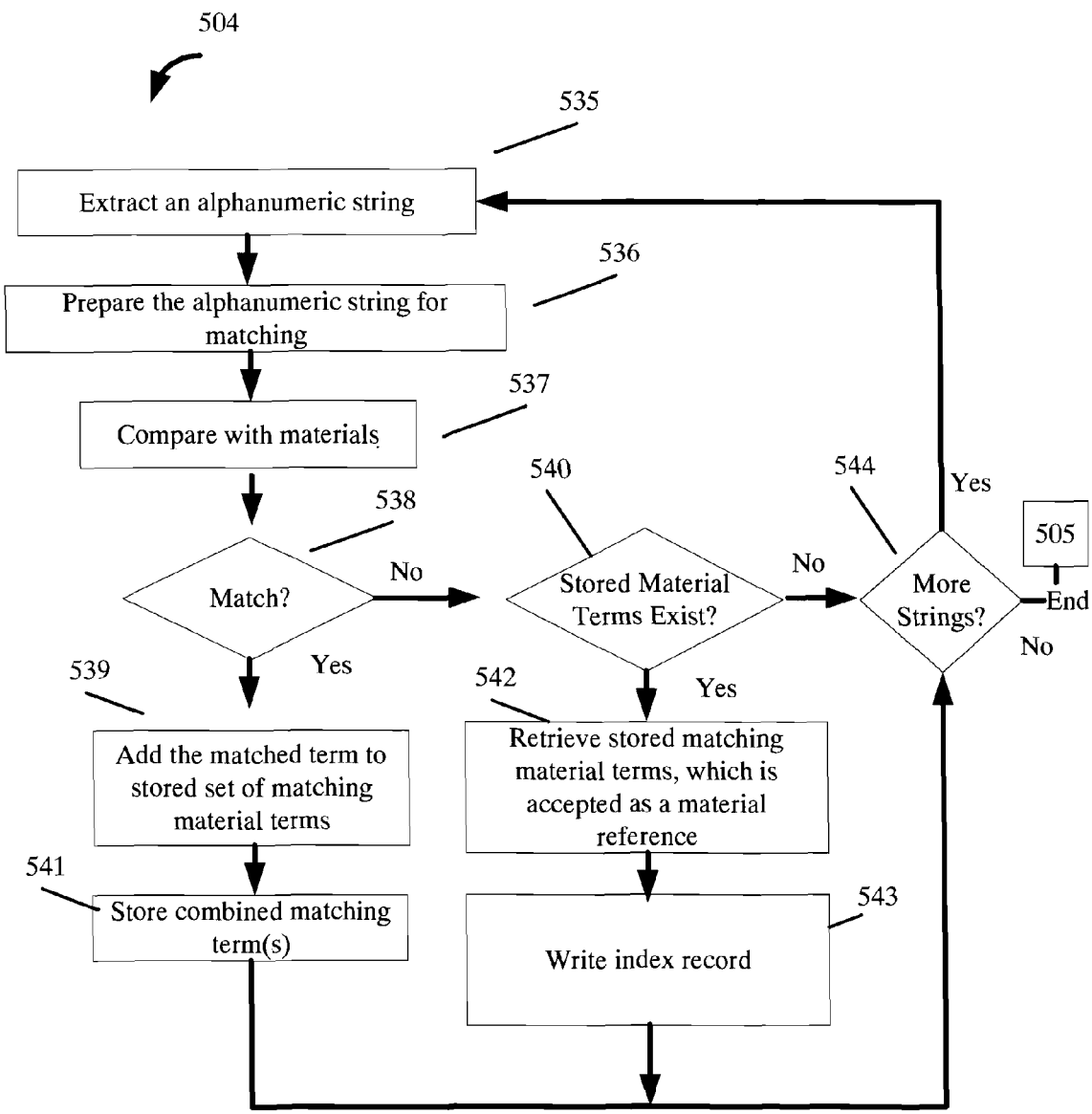
FIGS. 5B and 5C are flowcharts of a method for indexing documents in a data processing system according to one embodiment of the present invention.
Figure 5C:
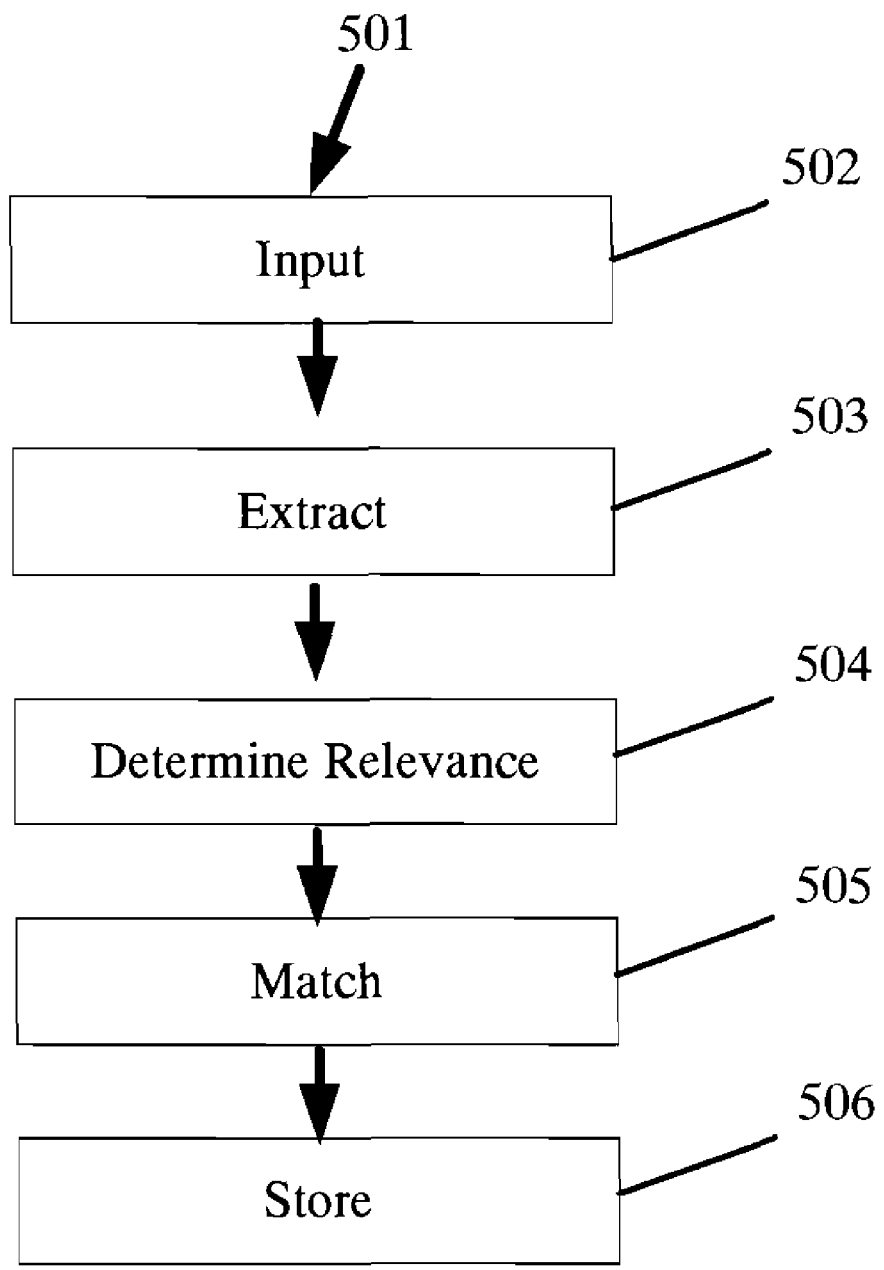

Referring now to FIGS. 5A, 5B, and 5C, an embodiment of the present invention is illustrated, providing the steps to index chemical entries in a document that includes a reference to at least one material, so that the data processing system can permit a search for a given chemical in order to return from a web server not only a direct reference but also a compilation of references to documents containing the chemical term including: (a) documents containing a synonymous reference to the chemical term; (b) documents containing a translated reference to the chemical term; (c) documents containing a reference to an identifier associated with the chemical term; (d) documents containing a reference to a parent class of which the chemical term is a member.

Referring now to FIG. 5C, in a method 501 at a step 502, the document is input, preferably in electronic format, such as HTML, Adobe PDF, Microsoft Excel, Microsoft Word, or in computer readable form such as XML or other document exchange format and preferably input into a document database 530. The software of the present invention extracts all of the words or alphanumeric strings in the document in a step 503 and tests that it is a word and not simply a sequence of control codes or other information. In one embodiment of the present invention, a found word is compared to a dictionary of common words in order to suppress words that are not chemical terms, which has the effect of decreasing the size of the database and the speed of the indexing. Once the words are found in the document, a record in the index database is stored. In a preferred embodiment of the present invention the word is stored, including the address of the document whether a filename or hyperlink, the page on which the word is found, and the position of the word on the page. One method for defining the position of the term on the page is to define a rectangular area that encompasses the area of the word on the page, and to store the coordinates of the rectangle in the index record.

In a step 504 the relevance of the extracted words or alphanumeric strings in the document as stored in the index is determined by comparing, in sequence and in combination, the extracted words or alphanumeric strings to a dictionary database of material terms. The material terms dictionary database contains at least one of the following: a unique material identification code, a preferred name of the instance of the material, and a name used for matching against a document term (Matchname). An extracted word or alphanumeric string is compared to an index of Matchnames from the database of material terms, such as by retrieving the extracted word or alphanumeric string from a document index, discussed in more detail below. If a match occurs in a step 505, an index record is prepared for at least one of the following: (a) found chemical, (b) document, (c) document address, (d) material code, after which the record is stored in the materials index in a step 506. As a result of this embodiment of the indexing system, a particular chemical name is indexed against any entry in a plurality of documents in the document database.

Referring to FIG. 5B the sub-step 504 is shown in greater detail. After the alphanumeric strings have been extracted in the step 503, the first alphanumeric string is extracted in a step 535. In a step 536, the alphanumeric string is prepared for matching, such as by converting lower case characters to upper case, stripping punctuation, converting Greek letters to alphanumeric equivalents or the like. In a step 537, the alphanumeric string is compared with a dictionary database of material terms. In a step 538, if a match occurs, the method proceeds to the step 539 and the matched term is added to a stored set of matching material terms, after which the combined matching terms are combined in a step 541 and the method proceeds to the step 544 to test if there are more strings in the document. If there are no more strings, the sub-step 504 ends and the method 501 proceeds to the step 505. If there are more strings, the method returns to the step 535 to begin a new determination of relevance.

If no match occurs in the step 538, the method tests, in a step 540 if the stored material terms exist. If the stored material term does exist, the method proceeds to a step 542 where a stored matching material term is retrieved, which is accepted as a material reference and the method writes an index record in a step 543 after which the method proceeds to the step 544 to test if there are more strings in the document. If there are no more strings, the sub-step 504 ends and the method 501 proceeds to the step 505. If there are more strings, the method returns to the step 535 to begin a new determination of relevance. If no stored material terms exist in the step 540, the method proceeds to the step 544 to test if there are more strings in the document. If there are no more strings, the sub-step 504 ends and the method 501 proceeds to the step 505. If there are more strings, the method returns to the step 535 to begin a new determination of relevance.

Referring now to FIG. 5A, the materials database or dictionary database of common material terms is illustrated at 515 as including one or more of the following: (a) A unique material identification code or key 516; (b) a proper chemical name 517; (c) synonyms 518; (d) identifiers, e.g., an EU Reference Number, an EINECS number, etc. 519; (e) translations of chemical names 520; (f) members of parent classes, e.g., sodium chromate is a member of the class hexavalent chromium compounds; and other material attributes.

The embodiment of the indexing method in FIG. 5A and the present invention applies to any biological terms as they do to chemical terms, all encompassed within the definition of material as used in this invention: (a) A unique material identification code or key is assigned to an entry; (b) a proper name is assigned, e.g., *Citrus sinensis*; (c) synonyms are assigned, e.g. sweet orange; (d) identifiers that might be used, in this example none; (e) translations of the term e.g., Appelsien, sweet orange, Apelsiini, Arancia, and オレンジ; (f) members of parent classes, e.g., this example is a child of the parent class, citrus. In this manner the embodiment of the indexing method can, for example, reference documents establishing thresholds for pesticide residues and additionally cross-reference them to a particular cited item, such as sweet orange, a synonym in any language, or to a family of related items, such as citrus fruits, permitting the user to open the referenced document at the page at which the item is cited via a defined set of cross-indexed terms.

A master materials database is shown at 523 and defines the relationship with a master "material" that encompasses one or more entries in the materials database 515. A master material record has one or more of the following elements: (a) a unique master materials code or key 524; (b) a proper master name 525; (c) master identifiers associated with the master material 526; (d) attributes associated with the master material 527; (e) an identification that this is a parent class.

After the method 501 is complete, a cross-index is generated by retrieving a matched alphanumeric string from the step 505, matching the retrieved alphanumeric string with a matching master materials database key 524 and cross-indexing the matching records in the document database 530, the materials database 515, and the master materials database 523. In this embodiment of the present invention, the resulting cross-index permits a particular occurrence of a chemical term to be related not only to all indexed documents in the document database 530 containing the term, but to any synonym, translation, identifier or membership in a broad chemical class in the materials database 515 or the master materials database 523.

Referring now to FIG. 6, the results of the indexing of chemical terms in documents is illustrated in an example of an embodiment of the present invention. An example master material key (516 in FIG. 5A) is illustrated at 601. If there is an associated reference to a master material key (524 in FIG. 5A) that is a parent class the key entry is represented in 602. For example 608, in this instance the preferred name for the material entry is (E)-2-butanoic acid 603, indicating here as the "head_name" with a material identifier code 304 (601). One instance of a material linked to this index entry is the name, "crotonic acid" 604. This entry is found in the file, 21cfr176.180.pdf (607). An attribute of this entry is a citation, "21 CFR 176.180 Paper/paperboard (dry food)".

In another instance 609, the material is a member of a chemical class "Ungesättigte aliphatische Mono- und Dicarbonsäuren C3-C8", and this class is referenced in a document with the citation "BfR Empf. 35 [XXXV.] Mischpolymerisate: Ethylen, Propylen, Butylen, Vinylestern, ungesättigten aliphat." with the filename, de_350deutsch.pdf. (E)-2-butanoic acid is a member of the referenced class of chemicals.

FIG. 8 is an illustration of an example of a fragment from a document, 21 CFR §178.2010, with a sequence of words at 810, beginning "3.1 Mineral oil (CAS Reg. No. 8012-95-1): Not to exceed 40 percent by weight of the stabilizer formulation". In applying the method 501 of the present invention for indexing chemical terms to this portion of the document, the chemical term of interest in this fragment is "Mineral oil", which is embedded in a sequence of other alphanumeric characters and other non-alphanumeric punctuation, bit streams, and control codes. The first term of this sequence is extracted as indicated in steps 503 and 506. This alphanumeric sequence, "3.1", does not match any term in the materials database and is discarded.

One difficulty with existing indexing methods that is addressed by the present invention is that a chemical term may span many separated words 901 as illustrated in FIG. 9. Extracting only the first word length term in sequence, i.e., "Mineral" would not correctly represent the term in this example extract. One advantageous aspect of this embodiment of the present invention is that the comparative indexing method in the step of determining relevance 506 heuristically evaluates a series of possibilities as it processes the document by considering a plurality of terms in sequence. In one embodiment of this method, the terms in the material database 515 are taken in order of the longest alphanumeric sequence first.

In an illustration of this approach, the indexing utility extracts the word, "Mineral" in the step 503 and stores this term temporarily until the indexing method 501 can conclude that the best match has been found for the series, rejecting or accepting terms as the processing continues. For instance, "Mineral" might possibly be followed by "reinforced nylon resins", "Mineral oils and hydrocarbons", "Mineral oil based greases", or the like as shown at 901 although it does not in the document example 801. At this step the indexing method 501 has found a chemical term with a plurality of matches, and then seeks to narrow the possible matches by taking the second term, "oil" 801 following the term, "Mineral". "Mineral oil" in combination eliminates all other available terms in this example, and the method determines that "Mineral oil" with the internal identification material identification key (516 from FIG. 5A) of "1476" (902 in FIG. 9) matches this series of words in the document in the step 509. This match is then stored in the step 510.

The indexing method 501 then moves in sequence or sequentially to consider the following term, "(CAS" and the subsequent term "No". 803 that are discarded without matches. In a preferred embodiment of this method, a database of common (i.e. non-material) words may be additionally used to make the comparison more efficient by eliminating any common word, such as "the", "No.", "not", "to", "exceed". A common word in such a list would be ignored by the indexing method 501. In consequence, if the database of common words is used in the heuristic comparison step 508, the words of the phrase "Not to exceed" would be discarded as "common words" or "noise" without comparison to the material database.

In a further aspect of this embodiment of the present invention, the CAS Registry Number, "8012-95-1" 803, is an example of an identifier for the substance, "mineral oil" that can be itself extracted from the document by the indexing method 501 of the present invention and used in association with other material identification keys that are themselves linked to other document references.

In an embodiment of the indexing method 501, the words are pre-processed to strip punctuation and capitalize terms so that the comparison step can consider a number of equivalent chemical terms more easily. Taking an example, such as "(+) 1,6-Di-(4-amidinophenoxy)-n-hexan", whether the chemical appears with the use of parentheses or bracket characters does not matter, because the indexing method would treat the punctuation as noise. Similarly the embodiment would ignore case sensitivity, such as initial capitalization in a document reference.

Additionally, certain alphanumeric sequences taken together are considered as equivalent in the preferred embodiment of the indexing method. For example "Alphamuurolen", "a-Muurolene", and "α-Muuolene" are equivalent, permitting the "Alpha", "a-", and "α-" alphanumeric character sequences to be indexed as companion terms. Such terms can be in any position within the word, such as "2-Metossi-4-(2-propenil)fenil-β-D-glucopiranoside" which should be treated synonymously to ""2-Metossi-4-(2-propenil)fenil-beta-D-glucopiranoside". These variants are assigned to the matching material key 516 or 531.

In the previous example, the indexing method 501 found the term, "Mineral oil" in the text of the document and its associated reference to the material identification key "1476" 902. Once this identification has occurred, the material identification key 516 or 531 and thus the document reference may be related to all other references associated with the master material key 524. The master material key 524 may include direct references, synonyms, translations, or chemical or material classes. As an example of a material class, the material, "mineral oil" with its material identification key can be considered a member of the class, "cottonseed and other edible oils". Thus the master material identification key 524 would include a reference to this class.

The indexing method 501 of this embodiment of the present invention can be used to support a search for "mineral oil" that will return a reference to any available document that uses the term "cottonseed and other edible oils". In this example, the benefit of this cross-indexing is that the user would be able to rapidly determine that "mineral oil" is permitted as a surface lubricant by FDA in the production of resinous and polymeric coatings used in food contact uses under 21 CFR §175.300.

The method 501 for indexing and searching chemical terms has significant, beneficial application that assist in improving the safe and globally compliant use of product, for instance. The method 501 of the present invention permits a cross-referencing of documents by: (a) preferred chemical name, (b) identifier; (c) translation; (d) synonym; and (e) membership in a parent class.

Referring now to FIG. 7, a data processing system is illustrated as a preferred embodiment of the present invention that returns in response to a search based on the index described above for a particular material name, "crotonic acid", with found references to documents that include a reference to a synonym 703, one or more references to parent classes 701, 702, or a translated name 703. In this illustration of a preferred embodiment, the hyperlink to the document opens at the page of the document on which the particular reference is found.

Figure 13:
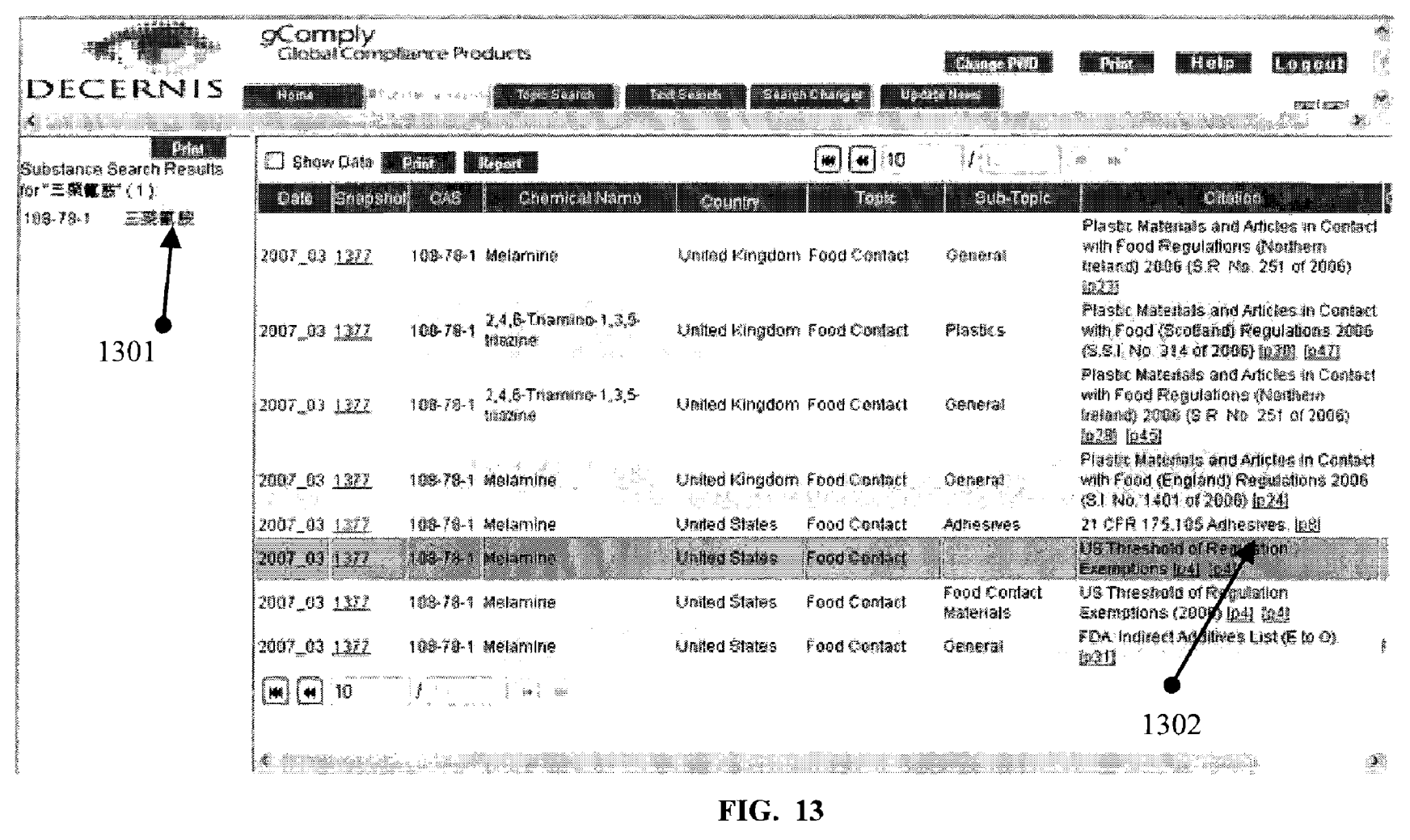

Referring now to FIG. 13, the above preferred embodiment of the present invention that returns in response to a search based on the index described above for a particular material name in a non-English language, "三聚氰胺" (melamine) 1301, with found references to documents, which in this case are a set of regulations that control this material in food contact use 1302. The hyperlink to the referenced document opens at the page of the document on which technical synonym in a different language appears. The benefits of the present embodiment return document cross-references across language, across synonym, and across associated class in contrast to the method illustrated in FIG. 12 where such results do not occur.

The preferred embodiment permits the user to enter a search term and to create a personalized profile of search terms in order to return a search result that is itself a compliance document. The personalized profile may include a plurality of materials, a plurality of topics, a plurality of jurisdictions or any combination of the above. The customized result from the user's search profile may be in any language whether the same or different from the input.

Another aspect of this embodiment of the present invention is that the indexing method can be applied to a subset, such as those documents that have changed over a particular period of time.

Referring now to FIG. 10, an embodiment of the present invention is illustrated in which the body of documents selected for search are "new" or "changed". The subset of documents subject to indexing and search may be assembled by either manual or automatic means. For example, manual research may have identified amendments to a certain topical area of regulations over a period of time, or a subsequent studies that have been published, or other subsequent publications during the given period. Automatic means may select a document subset as well.

In consequence, the present embodiment supports a search for a chemical that is affected by a change, whether the document that has changed refers directly to the chemical term, uses an identifier, a translation, or refers to a chemical class encompassing the term.

Figure 11:
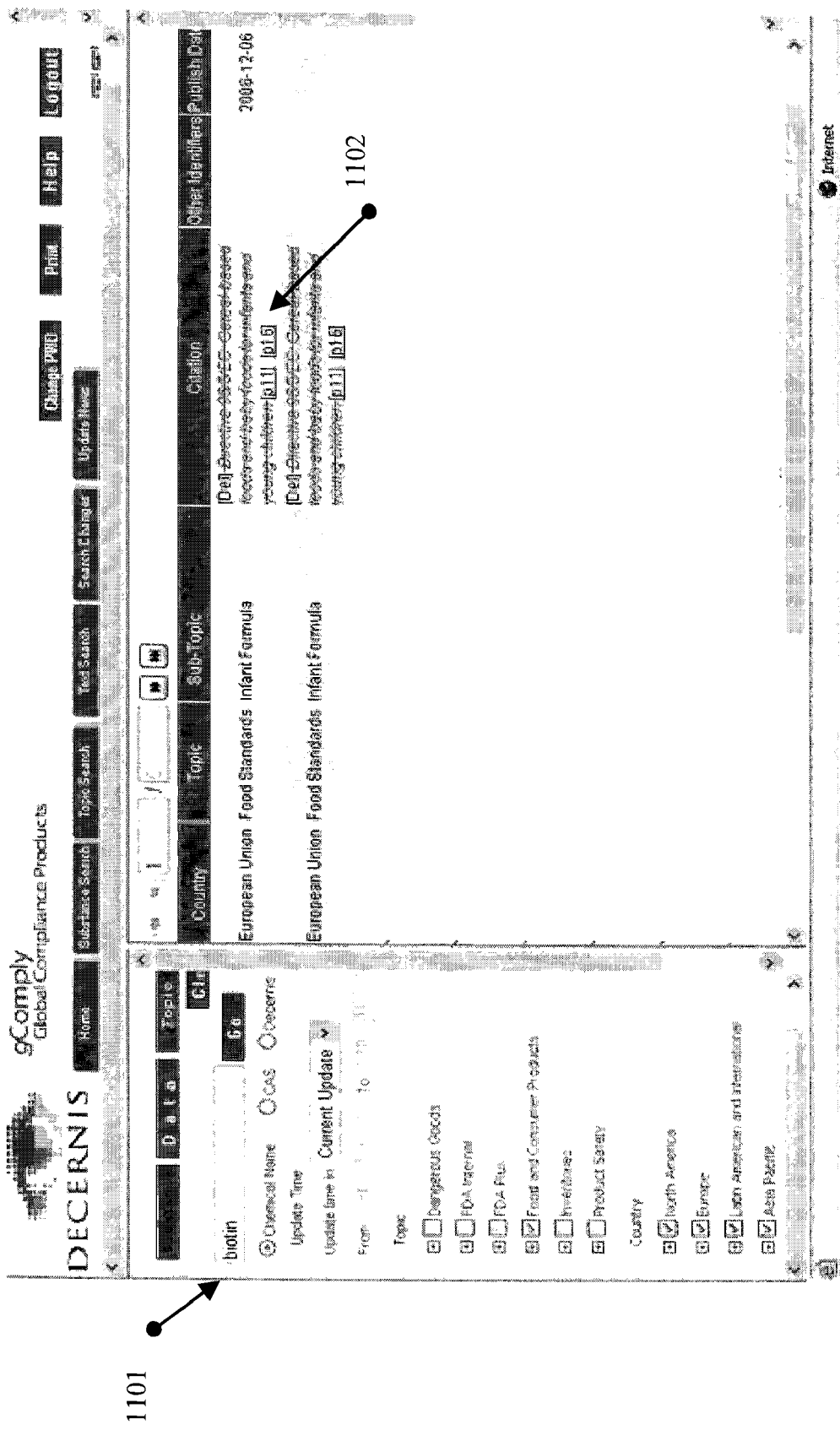
FIG. 11 is a diagram illustrating a materials database of one embodiment of the present invention.

Referring now to FIG. 11, a search for the term "biotin" 1101 returns a reference to a repealed European Union Directive 96/5/EC 1102, where a reference to this material was deleted by the action of a subsequently enacted directive. This document is a member of a subset of documents added or changed during a given period of time. In FIG. 11, the period of time is "the current update", and the color red and the citation struck through indicates that the document was repealed as one visual method of presentation in the present embodiment. The benefit of the present embodiment are that a researcher can more effectively keep abreast of changes that affect his or her use of materials that are referenced in newly published regulations or documents through the present data processing system. At present, the researcher must perform this task manually or through partially automated searches.

At present, the researcher must perform this task manually or through partially automated searches.

Figure 10A:
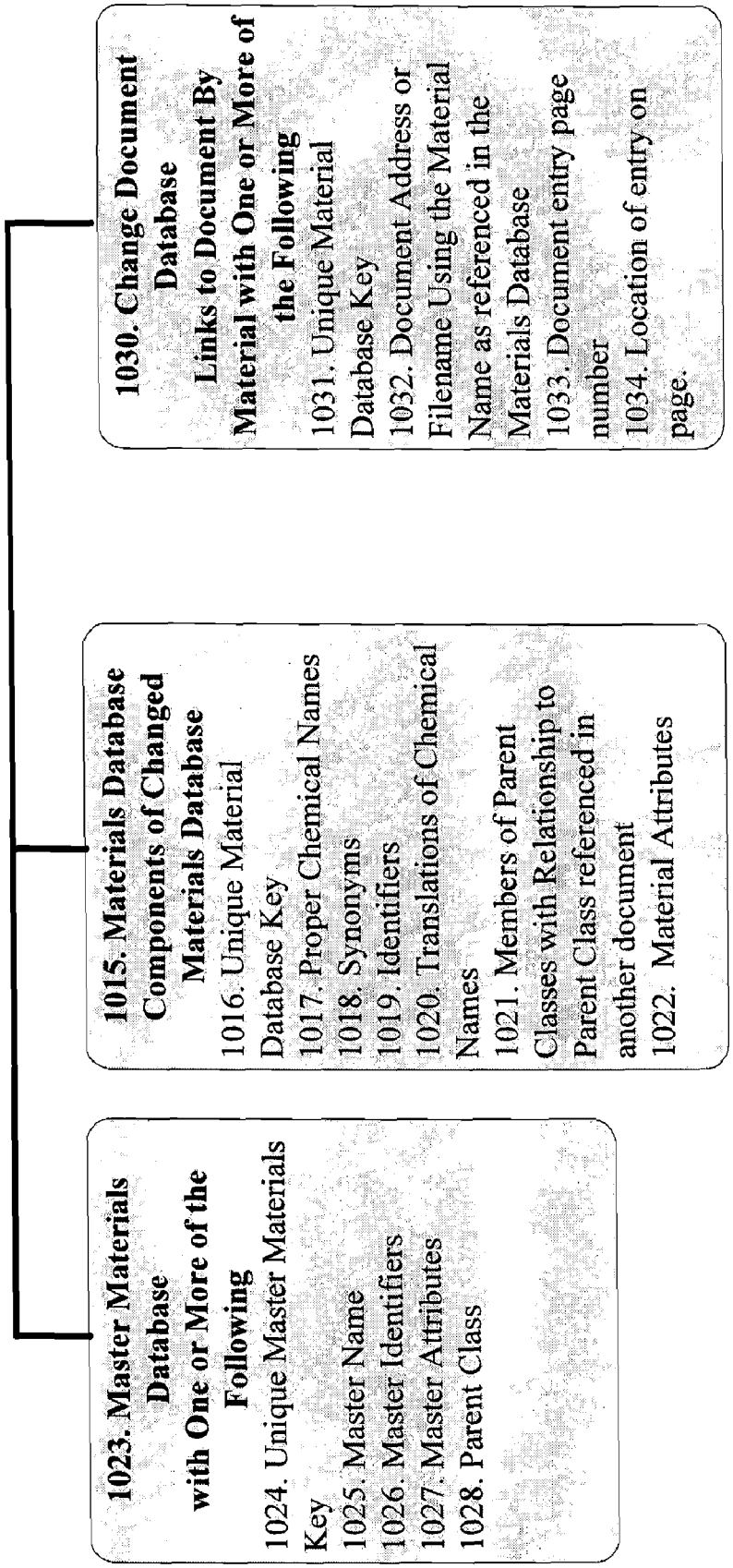
FIG. 10A is a block diagram of an alternative embodiment of a data processing system described herein.
Figure 10B:
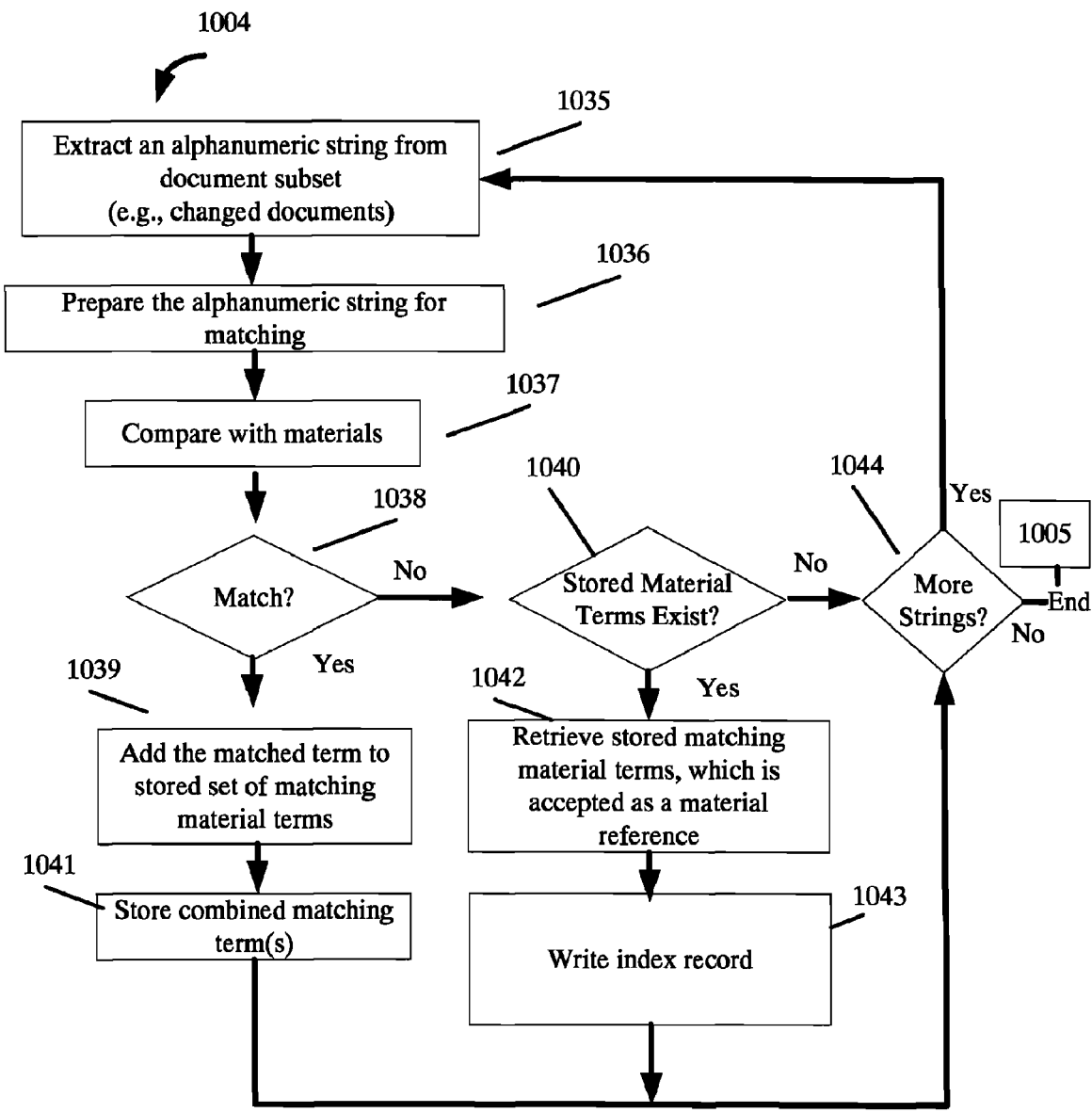
FIGS. 10B and 10C are flowcharts of an alternative embodiment of a method for indexing documents in a data processing system described herein.
Figure 10C:
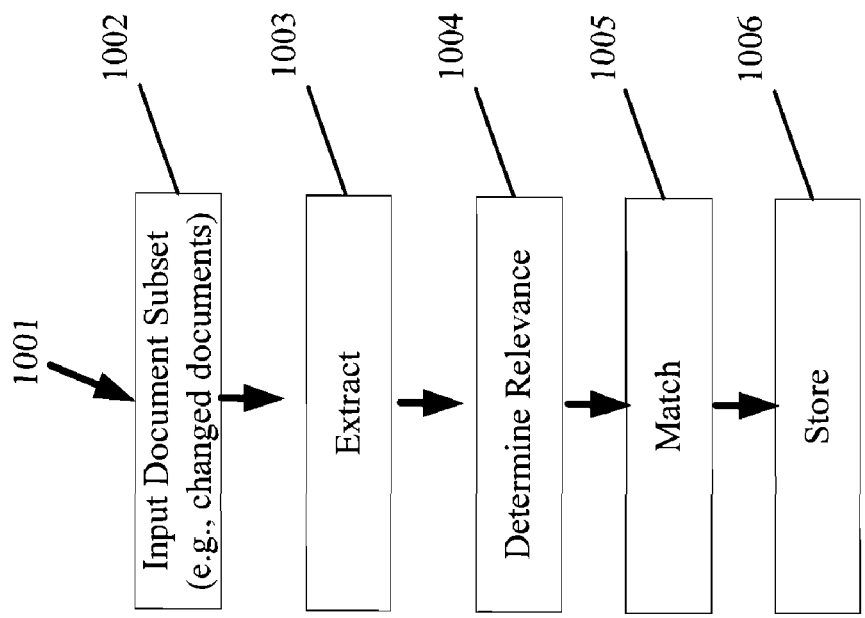

Referring now to FIGS. 10A, 10B, and 10C, an embodiment of the present invention is illustrated providing the steps to index chemical entries in a new, subset, or changed document that includes a reference to at least one material, so that the data processing system can permit a search for a given chemical in order to return from a web server not only a direct reference but also a compilation of references to documents containing the chemical term including: (a) documents containing a synonymous reference to the chemical term; (b) documents containing a translated reference to the chemical term; (c) documents containing a reference to an identifier associated with the chemical term; (d) documents containing a reference to a parent class of which the chemical term is a member.

Referring now to FIG. 10C, in a method 1001 at a step 1002, the document is input, preferably in electronic format, such as HTML, Adobe PDF, Microsoft Excel, Microsoft Word, or in computer readable form such as XML or other document exchange format and preferably input into a document database 1030. The software of the present invention extracts all of the words or alphanumeric strings in the document in a step 1003 and tests that it is a word and not simply a sequence of control codes or other information. In one embodiment of the present invention, a found word is compared to a dictionary of common words in order to suppress words that are not chemical terms, which has the effect of decreasing the size of the database and the speed of the indexing. Once the words are found in the document, a record in the index database is stored. In a preferred embodiment of the present invention the word is stored, including the address of the document whether a filename or hyperlink, the page on which the word is found, and the position of the word on the page. One method for defining the position of the term on the page is to define a rectangular area that encompasses the area of the word on the page, and to store the coordinates of the rectangle in the index record.

In a step 1004 the relevance of the extracted words or alphanumeric strings in the document as stored in the index is determined by comparing, in sequence and in combination, the extracted words or alphanumeric strings to a dictionary database of material terms. The material terms dictionary database contains at least one of the following: a unique material identification code, a preferred name of the instance of the material, and a name used for matching against a document term (Matchname). An extracted word or alphanumeric string is compared to an index of Matchnames from the database of material terms, such as by retrieving the extracted word or alphanumeric string from a document index, discussed in more detail below. If a match occurs in a step 1005, an index record is prepared for at least one of the following: (a) found chemical, (b) document, (c) document address, (d) material code (in this case for the subset of documents), after which the record is stored in the materials index in a step 1006. As a result of this embodiment of the indexing system, a particular chemical name is indexed against any entry in a plurality of documents in the document database.

Referring to FIG. 10B the sub-step 1004 is shown in greater detail. After the alphanumeric strings have been extracted in the step 1003, the first alphanumeric string from the document subset is extracted in a step 1035. In a step 1036, the alphanumeric string is prepared for matching, such as by converting lower case characters to upper, stripping punctuation, converting Greek letters to alphanumeric equivalents or the like. In a step 1037, the alphanumeric string is compared with a dictionary database of material terms. In a step 1038, if a match occurs, the method proceeds to the step 1039 and the matched term is added to a stored set of matching material terms, after which the combined matching terms are combined in a step 1041 and the method proceeds to the step 1044 to test if there are more strings in the document. If there are no more strings, the sub-step 1004 ends and the method 1001 proceeds to the step 1005. If there are more strings, the method returns to the step 1035 to begin a new determination of relevance.

If no match occurs in the step 1038, the method tests, in a step 1040, if the stored material terms exist. If the stored material term does exist, the method proceeds to a step 1042 where a stored matching material term is retrieved, which is accepted as a material reference and the method writes an index record in a step 1043 after which the method proceeds to the step 1044 to test if there are more strings in the document. If there are no more strings, the sub-step 1004 ends and the method 1001 proceeds to the step 1005. If there are more strings, the method returns to the step 1035 to begin a new determination of relevance. If no stored material terms exist in the step 1040, the method proceeds to the step 1044 to test if there are more strings in the document. If there are no more strings, the sub-step 1004 ends and the method 1001 proceeds to the step 1005. If there are more strings, the method returns to the step 1035 to begin a new determination of relevance.

Referring now to FIG. 10A, the materials database or dictionary database of common material terms according to one embodiment of the present invention is illustrated at 1015 as including one or more of the following: (a) A unique material identification code or key 1016; (b) a proper chemical name 1017; (c) synonyms 1018; (d) identifiers, e.g., an EU Reference Number, an EINECS number, etc. 1019; (e) translations of chemical names 1020; (f) members of parent classes, e.g., sodium chromate is a member of the class hexavalent chromium compounds; and other material attributes.

The change document database is illustrated at 1030 as including one or more of the following: (a) A unique material identification code or key 1031, which is related to 1016; (b) a document address or filename using the Matchname of the material; (c) a page number for the occurrence of the Matchname 1033; and (d) the location on the page of the term 1034.

A master materials database is shown at 1023 and defines the relationship with a master "material" that encompasses one or more entries in the materials database 1015. A master material record has one or more of the following elements: (a) a unique master materials code or key 1024; (b) a proper master name 1025; (c) master identifiers associated with the master material 1026; (d) attributes associated with the master material 1027; (e) an identification that this is a parent class.

After the method 1001 is complete, a cross-index is generated by retrieving a matched alphanumeric string from the step 1005, matching the retrieved alphanumeric string with a matching master materials database key 1024 and cross-indexing the matching records in the document database 1030, the materials database 1015, and the master materials database 1023. In this illustration of the present invention, the resulting cross-index permits a particular occurrence of a chemical term to be related not only to all indexed documents in the document database 1030 containing the term, but to any synonym, translation, identifier or membership in a broad chemical class in the materials database 1015 or the master materials database 1023.

Figure 14:
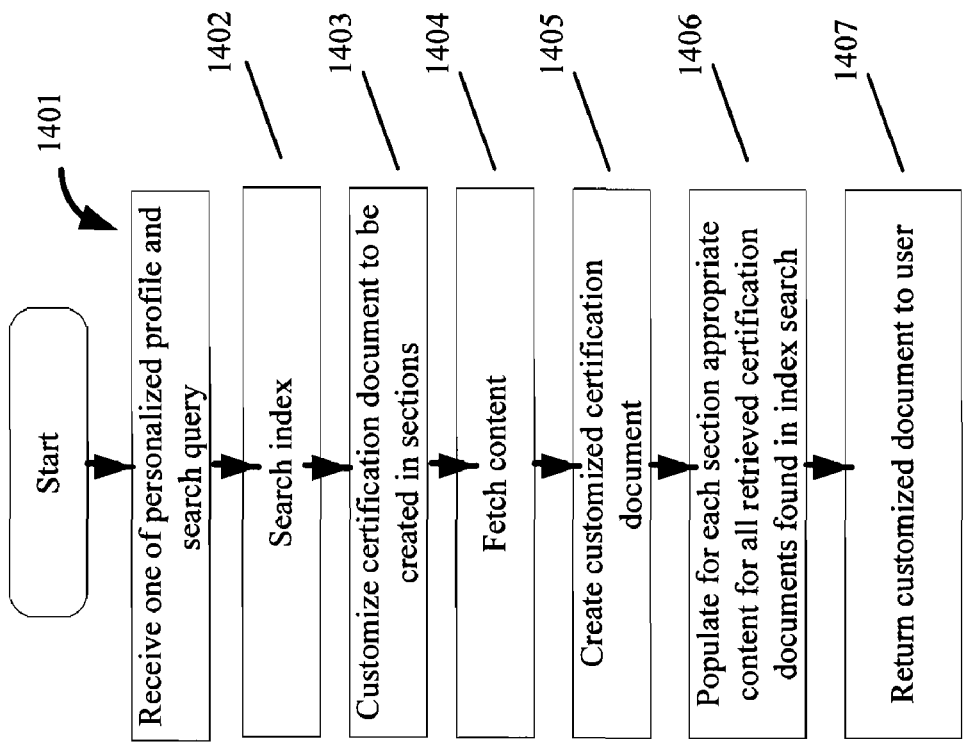
FIG. 14 is a diagram illustrating the creation of a customized certification document from one of a personalized profile and search query according to one embodiment of the present invention.

Referring now to FIG. 14, an embodiment of the present invention is depicted by which one of a personalized profile and search query 1401 returns a customized certification document 1407 to the user of a compilation service including certification documents. A compilation service would include but would not be limited to, for example, an aggregator of certification documents, a service offered to the user to generate a customized certification document, and a database service supporting the generation of customized certification documents. The query 1401 is searched against one of an index of certification documents and extracted data from such 1402. Based on the received query as described above, the sections of the customized certification document are determined 1403. Content is fetched from the index 1404, as described above, associated with the personalized query 1401. The base customized certification document is created 1405. For each one of a certification document and extracted data retrieved by means of the index, each section of the customized certification document is populated 1406 with appropriate unique content from the search of the index as described above that is associated with each one of fetched certification document and extracted data. The generated customized search document is returned to the user 1407.

An embodiment of the present invention as illustrated in FIG. 14 includes a search query that may be a material and an index that includes cross-references of materials selected from a proper name, an identifier, a translation, a synonym, a member of a parent class, and any combination thereof.

A further embodiment of the present invention as illustrated in FIG. 14 includes a further selection within the one of a personalized profile and search query of a regulation, a physico-chemical property, toxicological property, end use, a material, topic, or any combination thereof.

For example, the user of a compilation service may define a personalized search profile that may include but is not limited to a topic, such as food additives, a subtopic, such as contaminants, a period of time, such as the last month, a set of jurisdictions, such as China and the U.S., and a request for the generation of a certification document type, such as an analysis of proposed regulations. In response, the customized certification document is returned with sections that correspond to the criteria received by the user. The sections are populated with content that may include but is not limited to, for example, data, an analysis and a reference to a certification document, such as one of a Chinese proposed regulation, a translation, and a function that can be executed by the recipient to retrieve one of a document, document reference, document link, compilation, summary, data, and function to perform the same.

Another example of an embodiment of the present invention includes but is not limited to a personalized search profile that may include a material, such as a product formulation, and other elements of the example above in order to return an analysis of any proposed regulations affecting the entered product formulation or substance within it.

Another example of an embodiment of the present invention includes but is not limited to a personalized search profile that may include a material, such as a product formulation, and other elements of the example above in order to return an analysis of any proposed regulations affecting the entered one of a product formulation and substance within it that may be in any language and relate to the product by cross-reference that may be at least one of a synonym, an identifier, a translation, a member of a parent class.

Another example of an embodiment of the present invention includes but is not limited to a personalized search profile that may include at least one of a food, such as an orange, a class of foods, such as citrus fruits, and other elements of a search query that may, for example, include jurisdictions, such as the European Union and the U.S., and a certification document type, such as an analysis, in order to return a customized certification document with sections defining restrictions of contaminants for the food by jurisdiction, regardless of the language of the certification documents retrieved during the search.

A further example of an embodiment of the present invention includes but is not limited to the creation of a customized certification document where the type of certification document created is, for instance, a compliance statement and the topic is, for example, food contact, and the language for the customized certification document to be generated in is, for instance, English and a product formulation is given as part of the query. Such a customized certification document may equally include an end use, such as use in beverages. Further, an example of a customized certification document may be generated based on given criteria that include a country, a regulation, a physico-chemical property, a toxicological property, an end use, a material, a topic or any combination of the above.

Embodiments of the present invention may also be practiced by a computer readable medium storing executable software code thereon for executing the indexing method and the system for validating certification documents in accordance with the present invention, as will be appreciated by those skilled in the art. Embodiments of the present invention may also be practiced by a device, such as a personal computer or the like, having a processor, wherein the processor is responsive to software instructions; and software instructions adapted to enable the processor to execute the indexing method and the system for validating certification documents in accordance with the present invention, as will be appreciated by those skilled in the art.

Embodiments of the present invention produce an advantageous technical effect by providing a data processing system that more effectively communicates parameters of use of products in a supply chain by utilizing dynamic control statements in certification documents that may be validated by a recipient of the certification document, thereby improving the safe and compliant use of the products in the supply chain by the recipient. The present invention thereby provides a further technical effect which lends technical character to the embodied computer programs in the control of an industrial process and in processing data that represents parameters of use of physical entities through the dynamic control statements. In consequence, the present invention provides a solution to a difficult supply chain management problem by the automatic validation of certification documents.

Embodiments of the present invention have been described in terms of preferred embodiments and nonlimiting examples, however, it will be appreciated that various modifications and improvements may be made to the described embodiments and examples without departing from the scope of the invention.

What is claimed is:

1. A method for creating a customized certification document associated with a user of a compilation service, the customized certification document providing a compilation which includes at least one of the group consisting of regulatory standards, industry standards, warning statements, proper use statements, chemical properties, biological properties, toxicological properties, infectious properties, and compliance certification documents, said compilation being in the form of at least one of electronic documents and hyperlinks to said documents, comprising the steps of:

receiving at least one of a personalized profile and a search query from the user via a network, wherein at least one of the personalized profile and the search query includes identification which includes at least one of the group consisting of a certification providing party, a material of interest to the user, a topic of interest to the user and a standards-maintaining party;

creating a customized certification document at a network computer, wherein the network computer is programmed to create the customized certification document by:

dividing the certification document to be created into a plurality of sections wherein at least one of the plurality of sections contains content related to one or more indexed certification documents and extracted data identified in response to at least one of the personalized profile and search query, wherein the indexed certification documents includes at least one compliance certification document prepared by a certification supplying party;

searching one or more indexed certification documents and extracted data using at least one of the group consisting of the personalized profile and search query provided by the user;

fetching content related to any indexed certification documents or extracted data identified in the searching step; and populating the one or more of the plurality of sections with the content fetched to produce a customized certification document; and making the customized certification document available to the user by at least one of the group consisting of transmission over the network and direct delivery.

2. The method of claim 1, wherein one of the search query is associated with a material and the customized certification document created is produced by associating the search query with a cross-reference selected from a proper name, an identifier, a translation, a synonym, a member of a parent class or any combination thereof found within a certification document that is indexed by cross-referencing the search term and wherein the certification document is in the same language or a different language from the search term.

3. The method of claim 2, further comprising selecting, within at least one of the group consisting of the personalized profile and search query, identification at least one of the group consisting of a country, a regulation, a physiochemical property, toxicology property, an end use a material, and a topic to further define the customized certification document to be created.

4. The method of claim 1, wherein the customized certification document is formatted in a manner permitting the user to provide at least a portion of the customized certificate statement to a certification receiving party.

5. The method of claim 1, wherein the customized certification document includes identification of changes in the customized certification document or in information from which the customized certification document was generated after a first time the user accesses the customized certification document.

* * * * *